US010698399B2

(12) United States Patent
Brownie et al.

(10) Patent No.: US 10,698,399 B2
(45) Date of Patent: Jun. 30, 2020

(54) HVAC SYSTEM WITH EQUIPMENT FAILURE PREDICTION

(71) Applicant: Johnson Controls Technology Company, Plymouth, MI (US)

(72) Inventors: Michael R. Brownie, Milwaukee, WI (US); Gary A. Romanowich, Slinger, WI (US); Robert K. Alexander, Jackson, WI (US); Nathan J. Vandermause, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 412 days.

(21) Appl. No.: 15/483,667

(22) Filed: Apr. 10, 2017

(65) Prior Publication Data
US 2017/0293293 A1    Oct. 12, 2017

Related U.S. Application Data

(60) Provisional application No. 62/321,729, filed on Apr. 12, 2016.

(51) Int. Cl.
*G05B 23/02* (2006.01)
*G01M 99/00* (2011.01)
*F24F 11/32* (2018.01)

(52) U.S. Cl.
CPC ..... *G05B 23/0275* (2013.01); *G05B 23/0243* (2013.01); *F24F 11/32* (2018.01); *G05B 23/0283* (2013.01)

(58) Field of Classification Search
CPC ............ G05B 23/0275; G05B 23/0243; G05B 23/0283; F24F 11/32
See application file for complete search history.

(56) References Cited

U.S. PATENT DOCUMENTS

| | | | |
|---|---|---|---|
| 8,825,185 B2 | 9/2014 | Salsbury | |
| 9,465,370 B2 | 10/2016 | Alexander et al. | |
| 9,574,646 B1* | 2/2017 | Edsinger | F16H 21/16 |
| 9,641,122 B2 | 5/2017 | Romanowich et al. | |
| 9,746,199 B1 | 8/2017 | Drees et al. | |

(Continued)

OTHER PUBLICATIONS

U.S. Appl. No. 14/475,141, filed Sep. 2, 2014, Johnson Controls Technology Company.

(Continued)

*Primary Examiner* — Mohamed Charioui
*Assistant Examiner* — Jeremy A Delozier
(74) *Attorney, Agent, or Firm* — Foley & Lardner LLP

(57) ABSTRACT

A system for predicting HVAC equipment failure includes an actuator and a controller. The actuator is coupled to the HVAC equipment and configured to drive the HVAC equipment between multiple positions. The actuator includes a processing circuit configured to collect internal actuator data characterizing an operation of the actuator and a communications circuit coupled to the processing circuit. The communications circuit is configured to transmit the internal actuator data outside the actuator. The controller is configured to provide control signals to the actuator and receive the internal actuator data from the actuator. The controller includes a failure predictor configured to use the internal actuator data to predict a time at which the HVAC equipment failure will occur.

20 Claims, 16 Drawing Sheets

(56) References Cited

U.S. PATENT DOCUMENTS

| | | | |
|---|---|---|---|
| 2009/0287736 A1 | 11/2009 | Shike et al. | |
| 2010/0106319 A1* | 4/2010 | Grohman | G05D 27/02 700/276 |
| 2010/0123421 A1* | 5/2010 | Grabinger | F16K 31/046 318/561 |
| 2010/0286937 A1 | 11/2010 | Hedley et al. | |
| 2011/0161992 A1 | 6/2011 | Gutha et al. | |
| 2015/0039752 A1 | 2/2015 | Hague | |
| 2015/0106447 A1 | 4/2015 | Hague | |
| 2015/0260425 A1 | 9/2015 | Romanowich et al. | |
| 2015/0269641 A1* | 9/2015 | Roy | G06Q 30/0611 705/26.4 |
| 2016/0061480 A1 | 3/2016 | Alexander | |
| 2017/0003150 A1 | 1/2017 | Noboa et al. | |
| 2017/0295058 A1 | 10/2017 | Gottschalk et al. | |
| 2018/0046164 A1 | 2/2018 | Drees | |

OTHER PUBLICATIONS

U.S. Appl. No. 14/727,284, filed Jun. 1, 2015, Johnson Controls Technology Company.

U.S. Appl. No. 14/788,681, filed Jun. 30, 2015, Johnson Controls Technology Company.

U.S. Appl. No. 14/809,119, filed Jul. 24, 2015, Johnson Controls Technology Company.

U.S. Appl. No. 14/983,229, filed Dec. 29, 2015, Johnson Controls Technology Company.

U.S. Appl. No. 15/207,431, filed Jul. 11, 2016, Johnson Controls Technology Company.

U.S. Appl. No. 15/232,800, filed Aug. 9, 2016, Johnson Controls Technology Company.

U.S. Appl. No. 15/336,749, filed Oct. 27, 2016, Johnson Controls Technology Company.

U.S. Appl. No. 15/399,706, filed Jan. 5, 2017, Johnson Controls Technology Company.

Energy Design Resources, Design Brief: Economizers, Aug. 28, 2011, 28 pages.

Search Report for International Application No. PCT/US2017/027240, dated Oct. 17, 2017, 21 pages.

Office Action on U.S. Appl. No. 15/207,431 dated Aug. 23, 2018. 19 pages.

Office Action for U.S. Appl. No. 15/207,431, dated Mar. 29, 2018, 23 pages.

* cited by examiner

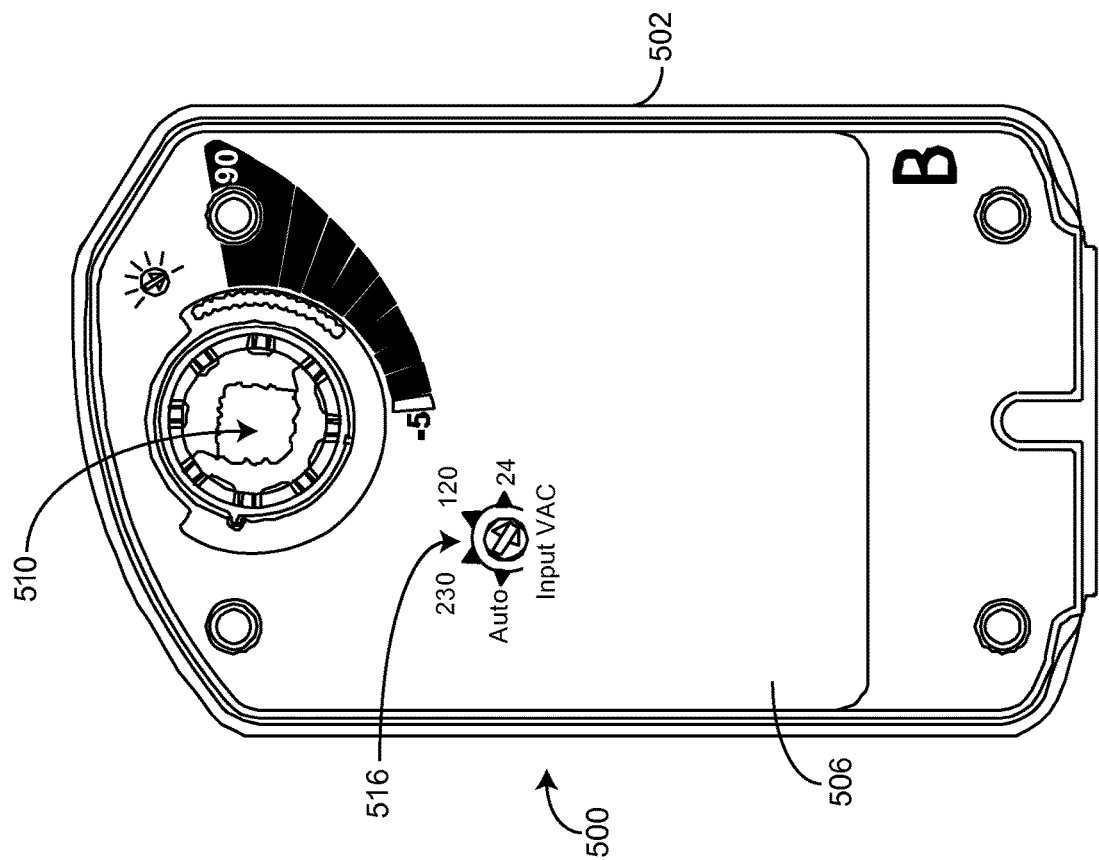
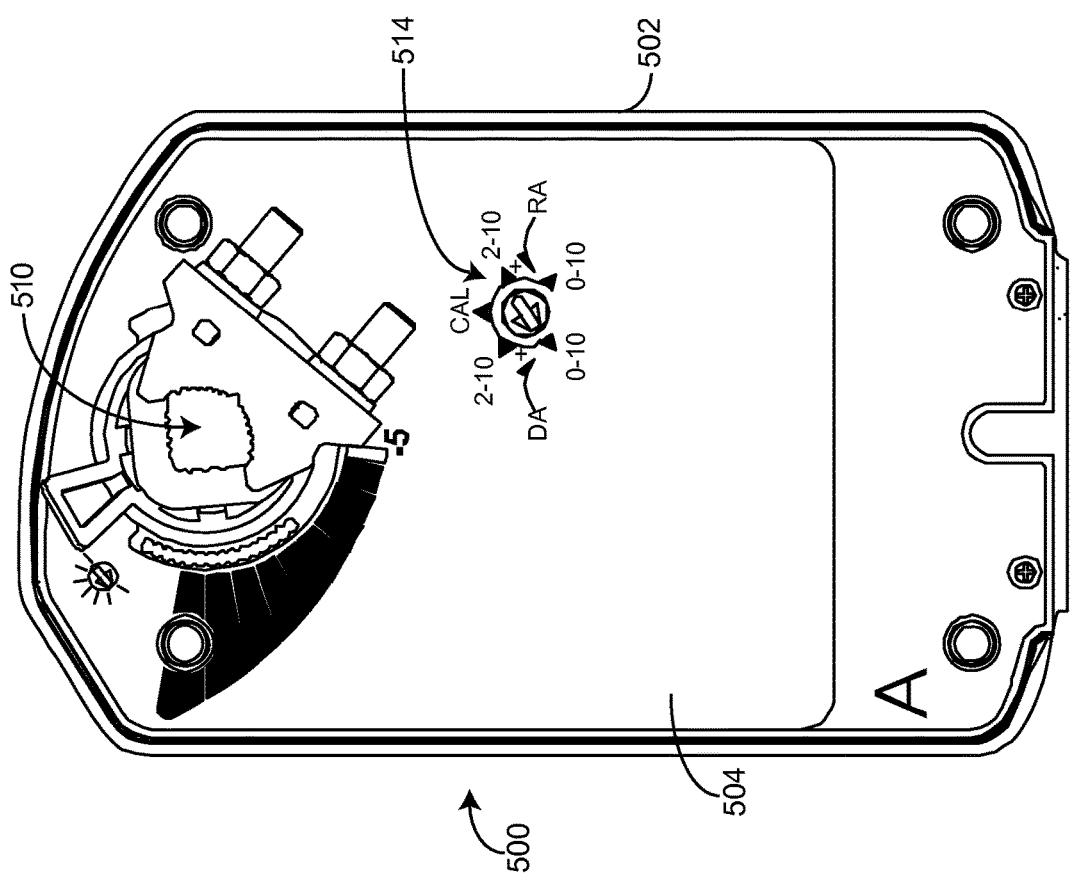

HVAC SYSTEM WITH EQUIPMENT FAILURE PREDICTION

CROSS-REFERENCE TO RELATED PATENT APPLICATION

This application claims the benefit of and priority to U.S. Provisional Patent Application No. 62/321,729 filed Apr. 12, 2016, the entire disclosure of which is incorporated by reference herein.

BACKGROUND

The present disclosure relates generally heating, ventilating, or air conditioning (HVAC) systems and more particularly to predicting equipment failure in a HVAC system.

HVAC actuators are used to operate a wide variety of HVAC components such as air dampers, fluid valves, air handling units, and other components that are typically used in HVAC systems. For example, an actuator can be coupled to a damper, valve, or other movable equipment in a HVAC system and can be used to drive the equipment between an open position and a closed position. An actuator typically includes a motor and a drive device (e.g., a hub, a drive train, etc.) that is driven by the motor and coupled to the HVAC component.

Equipment failure may occur when the actuator is unable to move the equipment, which can result in the equipment becoming stuck (e.g., stuck open, stuck closed, or stuck an intermediate position). Equipment failure can be caused by increased frictional wear and/or degradation of linkages and equipment components over time. Such wear and degradation can be accelerated by corrosive salt air if the equipment is installed in a marine environment.

Some actuators are configured to compensate for increased friction (i.e., increased resistance to movement) by increasing the electric current provided to the motor. Increasing the electric current provided to the motor causes the motor to apply an increased torque to the drive device and the equipment. Such compensation can be effective until the torque required to move the equipment exceeds a torque limit, at which point the motor stalls and the equipment becomes stuck.

Conventional actuators typically only output a feedback signal indicating the actuator position, but do not output or report any other types of data. Accordingly, equipment failure typically occurs with no warning, resulting in a time period of ineffective equipment operation until the equipment is repaired or replaced. It would be desirable to predict equipment failure before such failure occurs. However, typical actuators are unable to communicate the operational data required to equipment damper failure.

SUMMARY

One implementation of the present disclosure is a system for predicting HVAC equipment failure. The system includes an actuator coupled to the HVAC equipment and configured to drive the HVAC equipment between multiple positions. The actuator includes a processing circuit configured to collect internal actuator data characterizing an operation of the actuator and a communications circuit coupled to the processing circuit and configured to transmit the internal actuator data outside the actuator. The system further includes a controller configured to provide control signals to the actuator and receive the internal actuator data from the actuator. The controller includes a failure predictor configured to use the internal actuator data to predict a time at which the HVAC equipment failure will occur.

In some embodiments, the actuator includes a motor and a drive device driven by the motor. The drive device can be coupled to the HVAC equipment and configured to drive the HVAC equipment between the multiple positions. In some embodiments, the internal actuator data characterizes an operation of the motor.

In some embodiments, the internal actuator data includes a measured or calculated value of an operational variable. The operational variable may include at least one of an electric current provided to the motor or a torque applied by the motor.

In some embodiments, the processing circuit is configured to increase at least one of the electric current provided to the motor or the torque applied by the motor to compensate for increased resistance to movement of the HVAC equipment resulting from degradation of the HVAC equipment over time. In some embodiments, the predicted time at which the HVAC equipment failure will occur is a time at which the electric current provided to the motor or the torque applied by the motor is predicted to reach a failure threshold.

In some embodiments, the internal actuator data includes a measured or calculated value of an operational variable. The failure predictor can be configured to monitor the value of the operational variable over time, predict a time at which the value of the operational variable will reach a failure threshold, and identify the predicted time at which the value of the operational variable will reach the failure threshold as the predicted time at which the HVAC equipment failure will occur.

In some embodiments, the failure predictor is configured to identify a plurality of values of the operational variable. Each value of the operational variable may characterize the operation of the actuator at a different time since the actuator was installed. The failure predictor may generate a plurality of data points representing the values of the operational variable over time. Each of the data points may include a time value and a corresponding value of the operational variable. The failure predictor may perform a regression to fit a line to the plurality of data points and identify a slope of the line as a rate-of-change of the operational variable. The failure predictor may predict the time at which the value of the operational variable will reach the failure threshold based on the rate-of-change of the operational variable.

In some embodiments, the internal actuator data includes a measured or calculated value of an operational variable including at least one of a speed at which the actuator moves the HVAC equipment, a cumulative number of stop/start commands provided to the actuator by the controller, a total distance traveled by the HVAC equipment, or an amount of time required to move the HVAC equipment between the multiple positions.

Another implementation of the present disclosure is an actuator in a HVAC system. The actuator includes a motor and a drive device driven by the motor. The drive device is coupled to HVAC equipment and configured to drive the HVAC equipment between the multiple positions. The actuator further includes a processing circuit configured to collect internal actuator data characterizing an operation of the actuator. The processing circuit includes a failure predictor configured to use the internal actuator data to predict a time at which a failure of the HVAC equipment will occur. The actuator further includes a communications circuit coupled to the processing circuit and configured to transmit the predicted time at which the HVAC equipment failure will occur outside the actuator.

In some embodiments, internal actuator data includes a measured or calculated value of an operational variable characterizing an operation of the motor. The operational variable may include at least one of an electric current provided to the motor or a torque applied by the motor.

In some embodiments, the processing circuit is configured to increase at least one of the electric current provided to the motor or the torque applied by the motor to compensate for increased resistance to movement of the HVAC equipment resulting from degradation of the HVAC equipment over time. In some embodiments, the predicted time at which the HVAC equipment failure will occur is a time at which the electric current provided to the motor or the torque applied by the motor is predicted to reach a failure threshold.

In some embodiments, the internal actuator data includes a measured or calculated value of an operational variable. The failure predictor can be configured to monitor the value of the operational variable over time, predict a time at which the value of the operational variable will reach a failure threshold, and identify the predicted time at which the value of the operational variable will reach the failure threshold as the predicted time at which the HVAC equipment failure will occur.

In some embodiments, the failure predictor is configured to identify a plurality of values of the operational variable. Each value of the operational variable may characterize the operation of the actuator at a different time since the actuator was installed. The failure predictor may generate a plurality of data points representing the values of the operational variable over time. Each of the data points may include a time value and a corresponding value of the operational variable. The failure predictor may perform a regression to fit a line to the plurality of data points and identify a slope of the line as a rate-of-change of the operational variable. The failure predictor may predict the time at which the value of the operational variable will reach the failure threshold based on the rate-of-change of the operational variable.

In some embodiments, the internal actuator data includes a measured or calculated value of an operational variable including at least one of a speed at which the actuator moves the HVAC equipment, a cumulative number of stop/start commands provided to the actuator, a total distance traveled by the HVAC equipment, or an amount of time required to move the HVAC equipment between the multiple positions.

Another implementation of the present disclosure is a method for predicting HVAC equipment failure. The method includes operating an actuator coupled to the HVAC equipment to drive the HVAC equipment between multiple positions and collecting internal actuator data characterizing an operation of the actuator. The internal actuator data may include a measured or calculated value of an operational variable. The method includes predicting a time at which the value of the operational variable will reach a failure threshold and identifying the predicted time at which the value of the operational variable will reach the failure threshold as a predicted time at which the HVAC equipment failure will occur.

In some embodiments, the method includes providing control signals to the actuator from a controller and transmitting the internal actuator data from the actuator to the controller. In some embodiments, the predicting and identifying steps are performed by a failure predictor within the controller.

In some embodiments, the predicting and identifying steps are performed by a failure predictor within the actuator. The method may further include transmitting the predicted time at which the HVAC equipment failure will occur outside the actuator.

In some embodiments, the actuator includes a motor and a drive device driven by the motor. The drive device may be coupled to the HVAC equipment and configured to drive the HVAC equipment between the multiple positions. In some embodiments, the internal actuator data characterizes an operation of the motor. In some embodiments, the operational variable includes at least one of an electric current provided to the motor or a torque applied by the motor.

In some embodiments, the method includes increasing at least one of the electric current provided to the motor or the torque applied by the motor to compensate for increased resistance to movement of the HVAC equipment resulting from degradation of the HVAC equipment over time. In some embodiments, the predicted time at which the HVAC equipment failure will occur is a time at which the electric current provided to the motor or the torque applied by the motor is predicted to reach a failure threshold.

In some embodiments, predicting the time at which the value of the operational variable will reach the failure threshold includes identifying a plurality of values of the operational variable. Each value of the operational variable may characterize the operation of the actuator at a different time since the actuator was installed. The method may include generating a plurality of data points representing the values of the operational variable over time. Each of the data points may include a time value and a corresponding value of the operational variable. The method may include performing a regression to fit a line to the plurality of data points, identifying a slope of the line as a rate-of-change of the operational variable, and predicting the time at which the value of the operational variable will reach the failure threshold based on the rate-of-change of the operational variable.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIGS. 5-7 are drawings of an actuator which can be used in the HVAC system of FIG. 1, the waterside system of FIG. 2, the airside system of FIG. 3, or the BMS of FIG. 4 to control a HVAC component, according to some embodiments.

DETAILED DESCRIPTION

Figure 1:
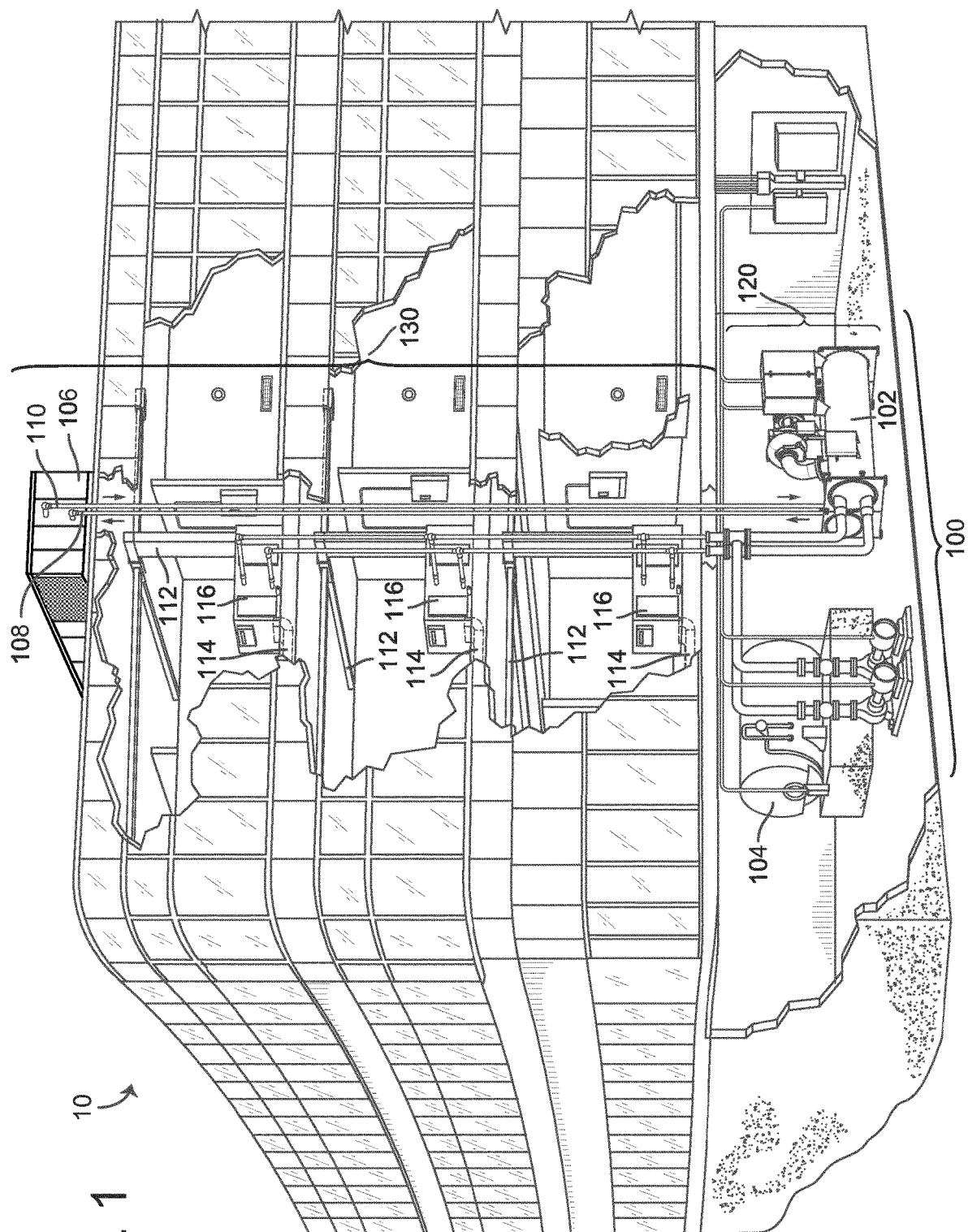
FIG. 1 is a drawing of a building equipped with a heating, ventilating, or air conditioning (HVAC) system and a building management system (BMS), according to some embodiments.

Referring generally to the FIGURES, a HVAC system with equipment failure prediction is shown, according to some embodiments. An equipment failure predictor is configured to predict a time at which equipment failure will occur based on data received from an actuator that operates the equipment. The equipment can include, for example, a damper, a valve, a mechanical device, or any other type of system or device that can be operated by an actuator. The internal actuator data can include measurements of motor current, motor torque, or other types of variables measured or tracked by the actuator. In some embodiments, the equipment failure predictor is a component of a controller for the actuator. In other embodiments, the equipment failure predictor is a component of the actuator. The failure predictor can calculate the motor torque based on measurements of the motor current or can receive the motor torque as an output from the actuator. The failure predictor can be configured to monitor the motor current and/or the motor torque over time to determine a rate at which the nominal motor current and/or the nominal motor torque is increasing.

In some embodiments, the failure predictor uses a regression technique to fit a line or curve to a set of data points indicating the nominal motor current and/or the nominal motor torque over time. Such data points can be collected (e.g., measured, calculated, etc.) over a time period that spans days, weeks, months, or years. The failure predictor can project or extrapolate the nominal motor current and/or the nominal motor torque forward in time to predict the motor current and/or the motor torque into the future. In some embodiments, the failure predictor determines a time at which the predicted motor current and/or the predicted motor torque exceeds a threshold value (e.g., a torque threshold, a current threshold, etc.). The failure predictor can identify the time at which the predicted motor current and/or the predicted motor torque exceeds the threshold value as the predicted equipment failure time.

The failure predictor can generate a warning message that includes the predicted failure time and can provide the warning message as an output to a user device. The warning message may indicate that the motor current and/or motor torque has exceeded a warning threshold and that equipment failure is predicted to occur at the predicted failure time. In some embodiments, the warning message prompts the user to repair or replace the equipment before failure occurs (i.e., before the predicted failure time). For example, the warning message may include contact information for a repair service (e.g., a telephone number or website URL), information for ordering replacement parts, and/or other types of information that can assist the user in preemptively repairing or replacing the equipment before failure occurs. Additional features and advantages of the equipment failure predictor are described in greater detail below.

Building Management System and HVAC System

Referring now to FIGS. 1-4, an exemplary building management system (BMS) and HVAC system in which the systems and methods of the present invention can be implemented are shown, according to some embodiments. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
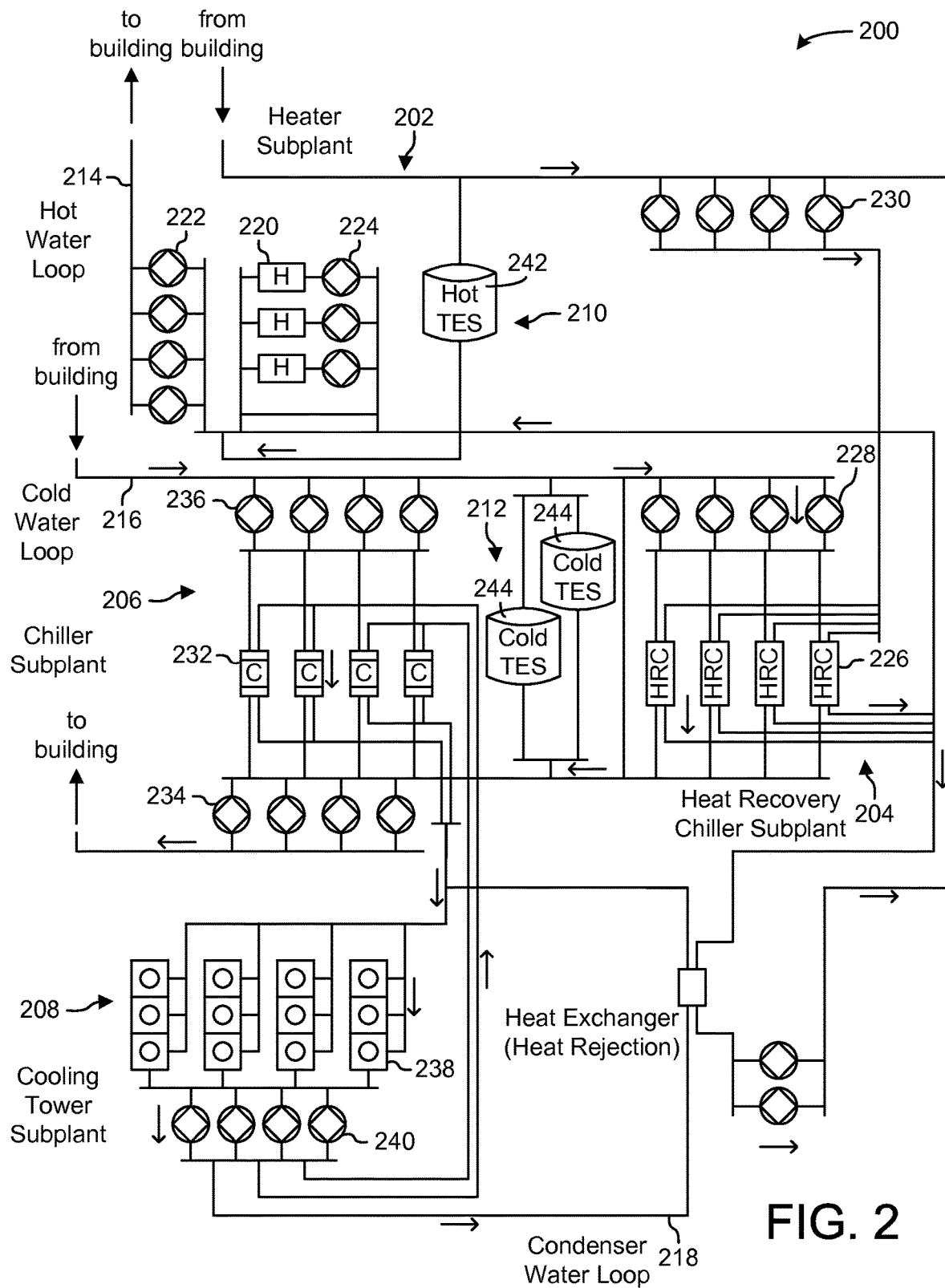
FIG. 2 is a schematic diagram of a waterside system which can be used to support the HVAC system of FIG. 1, according to some embodiments.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
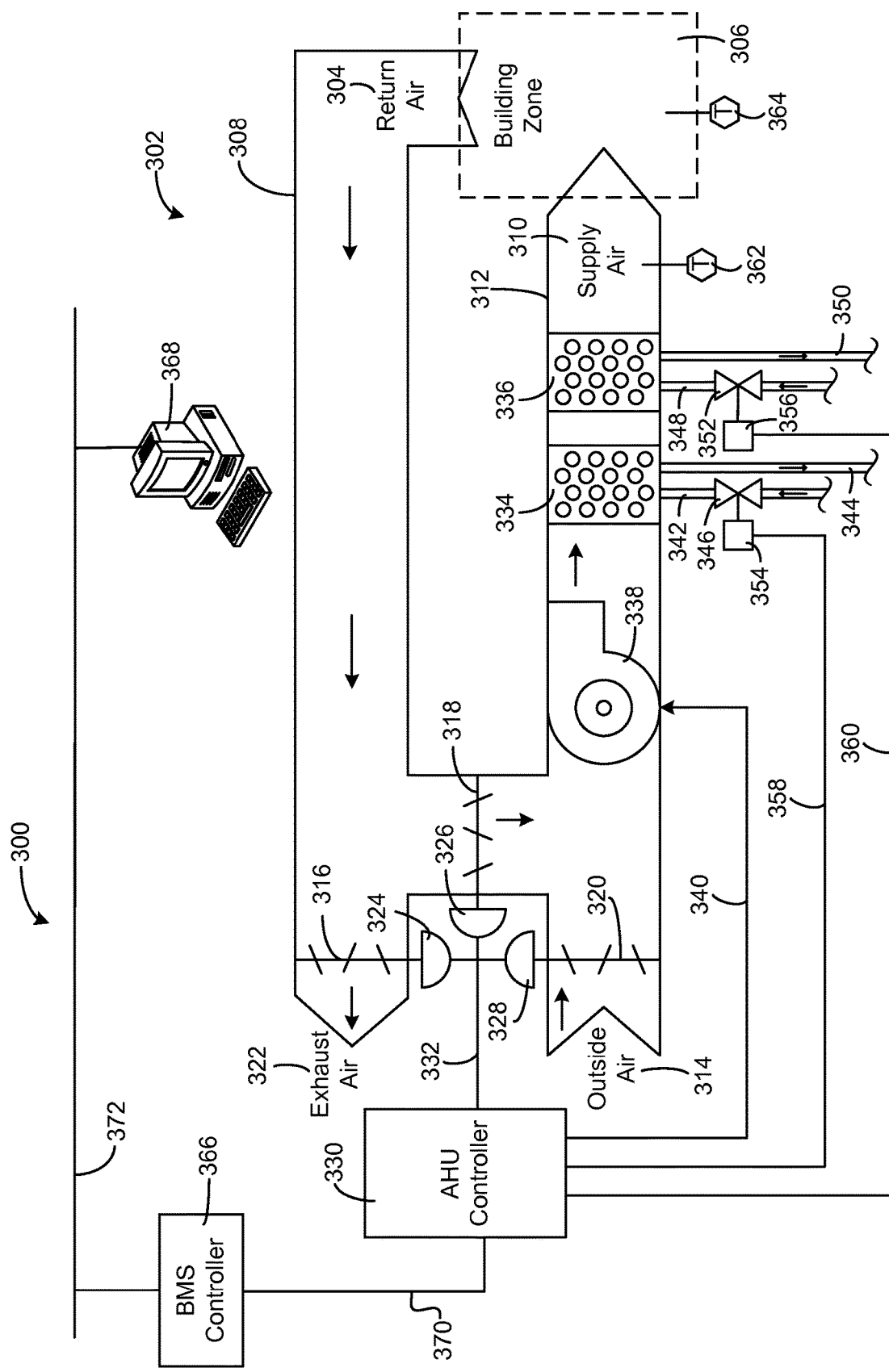
FIG. 3 is a block diagram of an airside system which can be used as part of the HVAC system of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
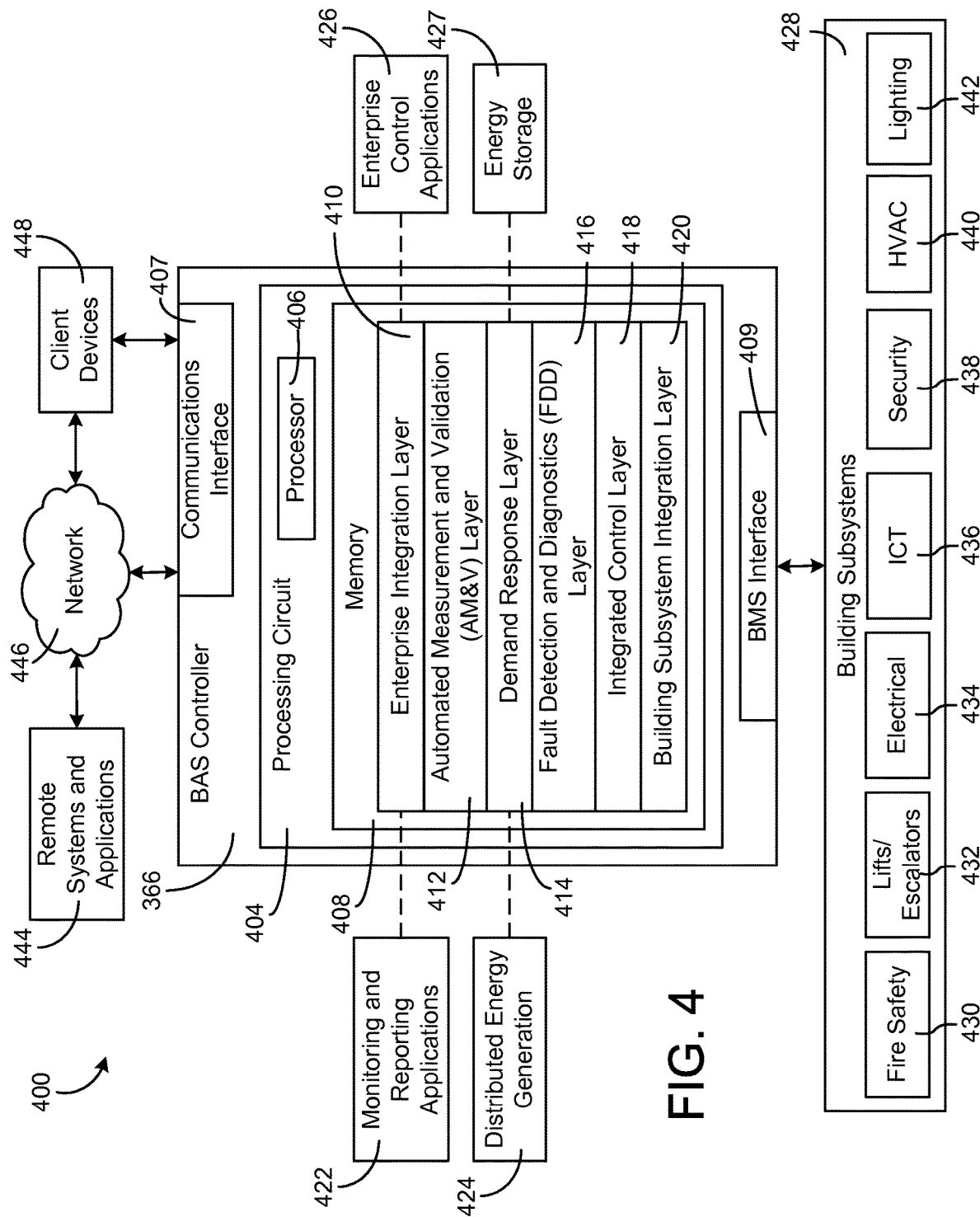
FIG. 4 is a block diagram of a BMS which can be implemented in the building of FIG. 1, according to some embodiments.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include and number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 may include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

HVAC Actuator

Figure 5:
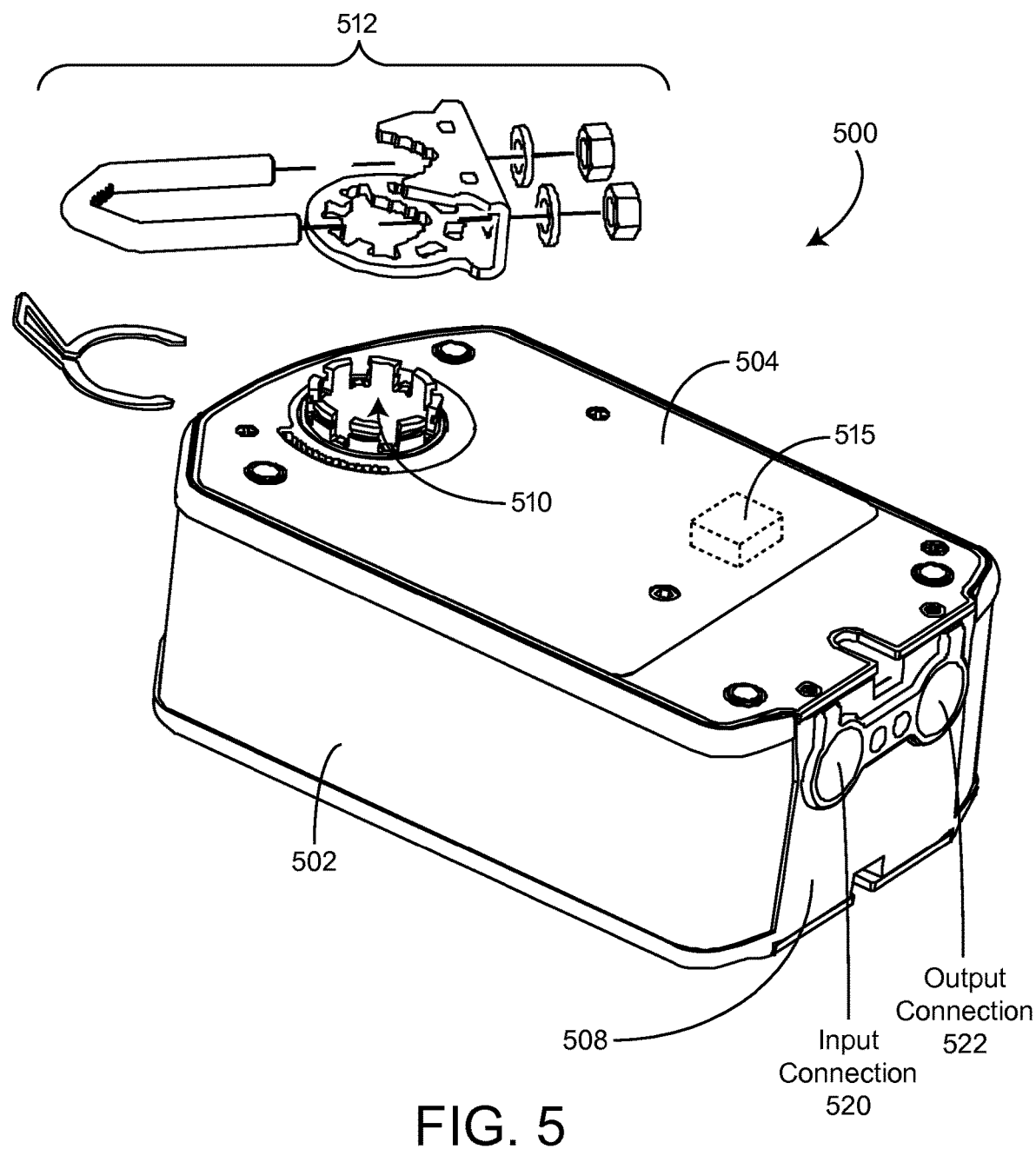

Referring now to FIGS. 5-7, an actuator 500 for use in a HVAC system is shown, according to some embodiments. In some implementations, actuator 500 can be used in HVAC system 100, waterside system 200, airside system 300, or BMS 400, as described with reference to FIGS. 1-4. For example, actuator 500 can be a damper actuator, a valve actuator, a fan actuator, a pump actuator, or any other type of actuator that can be used in a HVAC system or BMS. In various embodiments, actuator 500 can be a linear actuator (e.g., a linear proportional actuator), a non-linear actuator, a spring return actuator, or a non-spring return actuator.

Actuator 500 is shown to include a housing 502 having a front side 504 (i.e., side A), a rear side 506 (i.e., side B) opposite front side 504, and a bottom 508. Housing 502 may contain the mechanical and processing components of actuator 500. In some embodiments, housing 502 contains a brushless direct current (BLDC) motor and a processing circuit configured to provide a pulse width modulated (PWM) DC output to control the speed of the BLDC motor. The processing circuit can be configured to compare a representation of the electric current output to the BLDC motor to a threshold and may hold the PWM DC output in an off state when the current exceeds the threshold. The processing circuit may also be configured to set the PWM DC output to zero and then ramp up the PWM DC output when actuator 500 approaches an end stop. The internal components of actuator 500 are described in greater detail with reference to FIGS. 8-14.

Actuator 500 is shown to include a drive device 510. Drive device 510 can be a drive mechanism, a hub, or other device configured to drive or effectuate movement of a HVAC system component. For example, drive device 510 can be configured to receive a shaft of a damper, a valve, or any other movable HVAC system component in order to drive (e.g., rotate) the shaft. In some embodiments, actuator 500 includes a coupling device 512 configured to aid in coupling drive device 510 to the movable HVAC system component. For example, coupling device 512 may facilitate attaching drive device 510 to a valve or damper shaft.

Actuator 500 is shown to include an input connection 520 and an output connection 522. In some embodiments, input connection 520 and output connection 522 are located along bottom 508. In other embodiments, input connection 520 and output connection 522 can be located along one or more other surfaces of housing 502. Input connection 520 can be configured to receive a control signal (e.g., a voltage input signal) from an external system or device. Actuator 500 may use the control signal to determine an appropriate PWM DC output for the BLDC motor. In some embodiments, the control signal is received from a controller such as an AHU controller (e.g., AHU controller 330), an economizer controller, a supervisory controller (e.g., BMS controller 366), a zone controller, a field controller, an enterprise level controller, a motor controller, an equipment-level controller (e.g., an actuator controller) or any other type of controller that can be used in a HVAC system or BMS.

In some embodiments, the control signal is a DC voltage signal. Actuator 500 can be a linear proportional actuator configured to control the position of drive device 510 according to the value of the DC voltage received at input connection 520. For example, a minimum input voltage (e.g., 0.0 VDC) may correspond to a minimum rotational position of drive device 510 (e.g., 0 degrees, −5 degrees, etc.), whereas a maximum input voltage (e.g., 10.0 VDC) may correspond to a maximum rotational position of drive device 510 (e.g., 90 degrees, 95 degrees, etc.). Input voltages between the minimum and maximum input voltages may cause actuator 500 to move drive device 510 into an intermediate position between the minimum rotational position and the maximum rotational position. In other embodiments, actuator 500 can be a non-linear actuator or may use different input voltage ranges or a different type of input signal (e.g., AC voltage or current) to control the position and/or rotational speed of drive device 510.

In some embodiments, the control signal is an AC voltage signal. Input connection 520 can be configured to receive an AC voltage signal having a standard power line voltage (e.g., 120 VAC or 230 VAC at 50/60 Hz). The frequency of the voltage signal can be modulated (e.g., by a controller for actuator 500) to adjust the rotational position and/or speed of drive device 510. In some embodiments, actuator 500 uses the voltage signal to power various components of actuator 500. Actuator 500 may use the AC voltage signal received via input connection 520 as a control signal, a source of electric power, or both. In some embodiments, the voltage signal is received at input connection 520 from a power supply line that provides actuator 500 with an AC voltage having a constant or substantially constant frequency (e.g., 120 VAC or 230 VAC at 50 Hz or 60 Hz). Input connection 520 may include one or more data connections (separate from the power supply line) through which actuator 500 receives control signals from a controller or another actuator (e.g., 0-10 VDC control signals).

In some embodiments, the control signal is received at input connection 520 from another actuator. For example, if multiple actuators are interconnected in a tandem arrangement, input connection 520 can be connected (e.g., via a communications bus) to the output data connection of another actuator. One of the actuators can be arranged as a master actuator with its input connection 520 connected to a controller, whereas the other actuators can be arranged as slave actuators with their respective input connections connected to the output connection 522 of the master actuator.

Output connection 522 can be configured to provide a feedback signal to a controller of the HVAC system or BMS in which actuator 500 is implemented (e.g., an AHU controller, an economizer controller, a supervisory controller, a zone controller, a field controller, an enterprise level controller, etc.). The feedback signal may indicate the rotational position and/or speed of actuator 500. In some embodiments, output connection 522 can be configured to provide a control signal to another actuator (e.g., a slave actuator) arranged in tandem with actuator 500. Input connection 520 and output connection 522 can be connected to the controller or the other actuator via a communications bus.

In some embodiments, input connection 520 and output connection 522 can be replaced or supplemented by a communications circuit 580 (shown in FIG. 8) configured to support a variety of data communications between actuator 500 and external systems or devices. Communications circuit 580 can be a wired or wireless communications link and may use any of a variety of disparate communications protocols (e.g., BACnet, LON, WiFi, Bluetooth, NFC, TCP/IP, etc.). In some embodiments, communications circuit 580 is an integrated circuit, chip, or microcontroller unit (MCU) configured to bridge communications between actuator 500 and external systems or devices. An example of such a communications circuit 580 is described in greater detail with reference to FIGS. 16-17.

Still referring to FIGS. 5-7, actuator 500 is shown to include a first user-operable switch 514 located along front side 504 (shown in FIG. 6) and a second user-operable switch 516 located along rear side 506 (shown in FIG. 7). Switches 514-516 can be potentiometers or any other type of switch (e.g., push button switches such as switch 515, dials, flippable switches, etc.). Switches 514-516 can be used to set actuator 500 to a particular operating mode or to configure actuator 500 to accept a particular type of input. However, it should be understood that switches 514-516 are optional components and are not required for actuator 500 to perform the processes described herein. As such, one or more of switches 514-516 can be omitted without departing from the teachings of the present invention.

Referring particularly to FIG. 6, switch 514 can be a mode selection switch having a distinct number of modes or positions. Switch 514 can be provided for embodiments in which actuator 500 is a linear proportional actuator that controls the position of drive device 510 as a function of a DC input voltage received at input connection 520. In some embodiments, the function of mode selection switch 514 is the same or similar to the function of the mode selection switch described in U.S. patent application Ser. No. 14/727,284, filed Jun. 1, 2015, the entire disclosure of which is incorporated by reference herein. For example, the position of mode selection switch 514 can be adjusted to set actuator 500 to operate in a direct acting mode, a reverse acting mode, or a calibration mode.

Mode selection switch 514 is shown to include a 0-10 direct acting (DA) mode, a 2-10 DA mode, a calibration (CAL) mode, a 2-10 reverse acting (RA) mode, and a 0-10 RA mode. According to other exemplary embodiments, mode selection switch 514 may have a greater or smaller number of modes and/or may have modes other than listed as above. The position of mode selection switch 514 may define the range of DC input voltages that correspond to the rotational range of drive device 510. For example, when mode selection switch 514 is set to 0-10 DA, an input voltage of 0.0 VDC may correspond to 0 degrees of rotation position for drive device 510. For this same mode, an input voltage of 1.7 VDC may correspond to 15 degrees of rotation position, 3.3 VDC may correspond to 30 degrees of rotation position, 5.0 VDC may correspond to 45 degrees of rotation position, 6.7 VDC may correspond to 60 degrees of rotation position, 8.3 VDC may correspond to 75 degrees of rotation position, and 10.0 VDC may correspond to 90 degrees of rotation position. It should be understood that these voltages and corresponding rotational positions are merely exemplary and can be different in various implementations.

Referring particularly to FIG. 7, switch 516 can be a mode selection switch having a distinct number or modes or positions. Switch 516 can be provided for embodiments in which actuator 500 is configured to accept an AC voltage at input connection 520. In some embodiments, the function of mode selection switch 516 is the same or similar to the function of the mode selection switch described in U.S. patent application Ser. No. 14/475,141, filed Sep. 1, 2014, the entire disclosure of which is incorporated by reference herein. For example, the position of switch 516 can be adjusted to set actuator 500 to accept various different AC voltages at input connection 520.

Mode selection switch 516 is shown to include a "24 VAC" position, a "120 VAC" position, a "230 VAC" position, an "Auto" position. Each position of switch 516 may correspond to a different operating mode. According to other exemplary embodiments, switch 516 may have a greater or lesser number of positions and/or may have modes other than the modes explicitly listed. The different operating modes indicated by switch 516 may correspond to different voltage reduction factors applied to the input voltage received at input connection 520. For example, with switch 516 in the 24 VAC position, actuator 500 can be configured to accept an input voltage of approximately 24 VAC (e.g., 20-30 VAC) at input connection 520 and may apply a reduction factor of approximately 1 to the input voltage. With switch 516 in the 120 VAC position, actuator 500 can be configured to accept an input voltage of approximately 120 VAC (e.g., 100-140 VAC, 110-130 VAC, etc.) at input connection 520 and may apply a reduction factor of approximately 5 (e.g., 3-7, 4-6, 4.5-5.5, etc.) to the input voltage. With switch 516 in the 230 VAC position, actuator 500 can be configured to accept an input voltage of approximately 230 VAC (e.g., 200-260 VAC, 220-240 VAC, etc.) at input connection 520 and may apply a reduction factor of approximately 9.6 (e.g., 7-13, 8-12, 9-10, etc.) to the input voltage. With switch 516 in the "Auto" position, actuator 500 can be configured automatically determine the input voltage received at input connection 520 and may adjust the voltage reduction factor accordingly.

Speed and Torque Control

Figure 8:
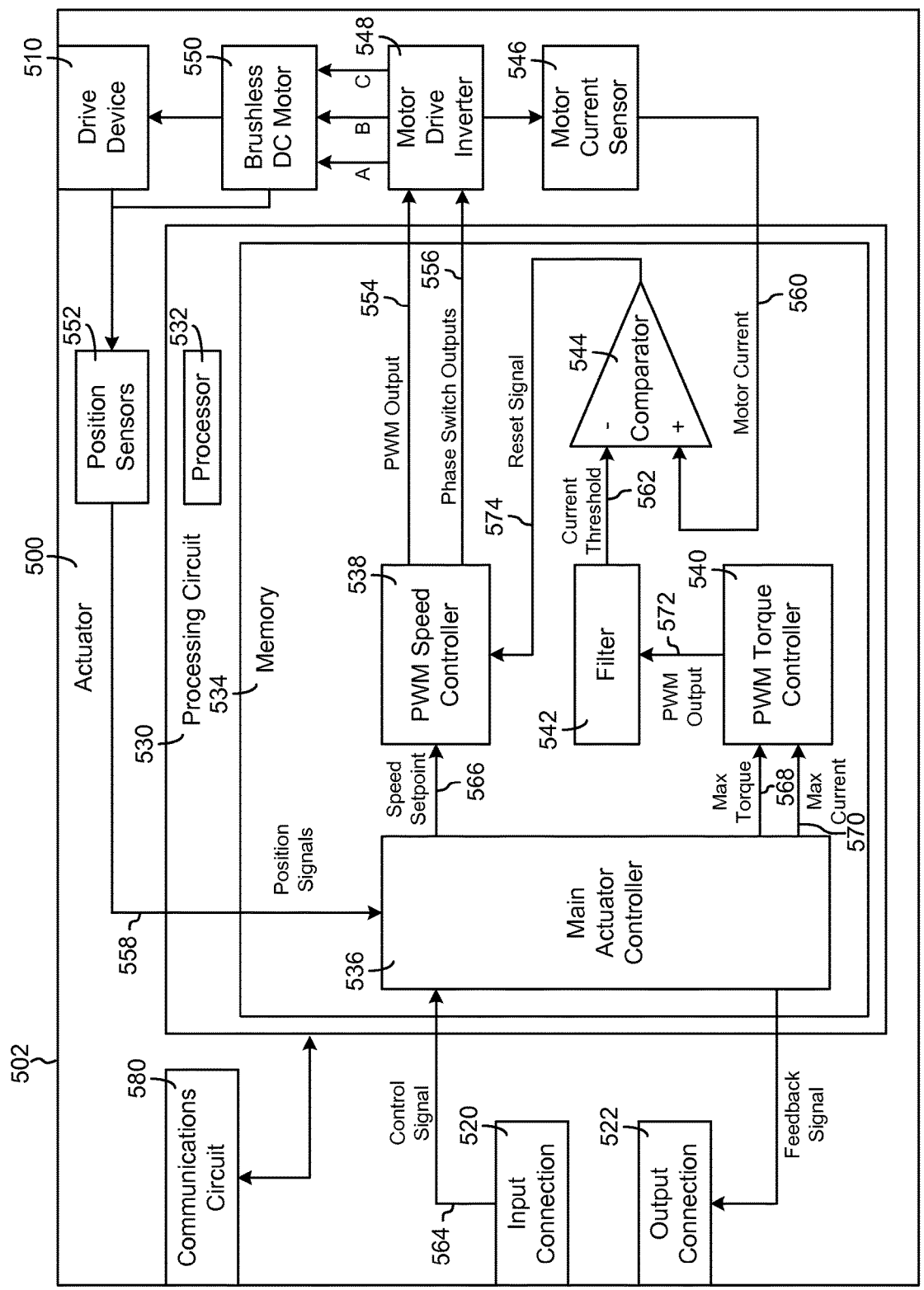
FIG. 8 is a block diagram illustrating the actuator of FIGS. 5-7 in greater detail, according to some embodiments.

Referring now to FIG. 8, a block diagram illustrating actuator 500 in greater detail is shown, according to some embodiments. Actuator 500 is shown to include input connection 520, output connection 522, and drive device 510 contained within housing 502. Actuator 500 is shown to further include a brushless DC (BLDC) motor 550 connected to drive device 510, a motor drive inverter 548 (e.g., an H-bridge) configured to provide a three-phase pulse width modulated (PWM) voltage output to BLDC motor 550, a motor current sensor 546 (e.g., a current sense resistor) configured to sense the electric current provided to BLDC motor 550, and position sensors 552 configured to measure the rotational position of BLDC motor 550 and/or drive device 510.

BLDC motor 550 can be connected to drive device 510 and can be configured to rotate drive device 510 through a range of rotational positions. For example, a shaft of BLDC motor 550 can be coupled to drive device 510 (e.g., via a drive train or gearing arrangement) such that rotation of the motor shaft causes a corresponding rotation of drive device 510. In some embodiments, the drive train functions as a transmission. The drive train may translate a relatively high speed, low torque output from BLDC motor 550 into a relatively low speed, high torque output suitable for driving a HVAC component connected to drive device 510 (e.g., a damper, a fluid valve, etc.). For example, the drive train may provide a speed reduction of approximately 1000:1, 2500:1, 5000:1, or any other speed reduction as can be suitable for various implementations.

BLDC motor 550 can be configured to receive a three-phase PWM voltage output (e.g., phase A, phase B, phase C) from motor drive inverter 548. The duty cycle of the PWM voltage output may define the rotational speed of BLDC motor 550 and can be determined by processing circuit 530 (e.g., a microcontroller). Processing circuit 530 may increase the duty cycle of the PWM voltage output to increase the speed of BLDC motor 550 and may decrease the duty cycle of the PWM voltage output to decrease the speed of BLDC motor 550. Processing circuit 530 is shown providing a PWM voltage output 554 and phase switch outputs 556 to motor drive inverter 548. Motor drive inverter 548 may use phase switch outputs 556 to apply PWM output 554 to a particular winding of BLDC motor 550. The operation of motor drive inverter 548 is described in greater detail with reference to FIG. 9.

Position sensors 552 may include Hall effect sensors, potentiometers, optical sensors, or other types of sensors configured to measure the rotational position of BLDC motor 550 and/or drive device 510. Position sensors 552 may provide position signals 558 to processing circuit 530. Processing circuit 530 uses position signals 558 to determine whether to operate BLDC motor 550. For example, processing circuit 530 may compare the current position of drive device 510 with a position setpoint received via input connection 520 and may operate BLDC motor 550 to achieve the position setpoint.

Motor current sensor 546 can be configured to measure the electric current provided to BLDC motor 550. Motor current sensor 546 may generate a feedback signal indicating the motor current 560 and may provide feedback signal to processing circuit 530. Processing circuit 530 can be configured to compare the motor current 560 to a threshold 562 (e.g., using comparator 544) and may hold PWM output 554 in an off state when motor current 560 exceeds threshold 562. In some embodiments, processing circuit 530 provides motor current 560 as an output to an external system or device via communication circuit 580. Processing circuit 530 may also be configured to set PWM output 554 to zero and then ramp up PWM output 554 when the position of drive device 510 approaches an end stop. These and other features of actuator 500 are described in greater detail below.

Still referring to FIG. 8, processing circuit 530 is shown to include a processor 532 and memory 534. Processor 532 can be a general purpose or specific purpose processor, an application specific integrated circuit (ASIC), one or more field programmable gate arrays (FPGAs), a group of processing components, or other suitable processing components. Processor 532 can be configured to execute computer code or instructions stored in memory 534 or received from other computer readable media (e.g., CDROM, network storage, a remote server, etc.).

Memory 534 may include one or more devices (e.g., memory units, memory devices, storage devices, etc.) for storing data and/or computer code for completing and/or facilitating the various processes described in the present disclosure. Memory 534 may include random access memory (RAM), read-only memory (ROM), hard drive storage, temporary storage, non-volatile memory, flash memory, optical memory, or any other suitable memory for storing software objects and/or computer instructions. Memory 534 may include database components, object code components, script components, or any other type of information structure for supporting the various activities and information structures described in the present disclosure. Memory 534 can be communicably connected to processor 532 via processing circuit 530 and may include computer code for executing (e.g., by processor 532) one or more processes described herein. When processor 532 executes instructions stored in memory 534, processor 532 generally configures actuator 500 (and more particularly processing circuit 530) to complete such activities.

Processing circuit 530 is shown to include a main actuator controller 536. Main actuator controller 536 can be configured to receive control signals 564 from input connection 520 (e.g., position setpoints, speed setpoints, etc.) and position signals 558 from position sensors 552. Main actuator controller 536 can be configured to determine the position of BLDC motor 550 and/or drive device 510 based on position signals 558. In some embodiments, main actuator controller 536 calculates the speed of BLDC motor 550 and/or drive device 510 using a difference in the measured positions over time. For example, the speed of BLDC motor 550 can be determined by main actuator controller 536 using a measured time between Hall sensor interrupt signals provided by Hall sensors integral to BLDC motor 550.

Main actuator controller 536 may determine an appropriate speed setpoint 566 for BLDC motor 550 (e.g., in percentage terms, in terms of absolute position or speed, etc.). In some embodiments, main actuator controller 536 provides speed setpoint 566 to PWM speed controller 538. In other embodiments, main actuator controller 536 calculates an appropriate PWM duty cycle to achieve a desired speed and provides the PWM duty cycle to PWM speed controller 538. In some embodiments, main actuator controller 536 calculates speed setpoint 566 based on the position of drive device 510.

Still referring to FIG. 8, processing circuit 530 is shown to include a PWM speed controller 538. PWM speed controller 538 may receive a speed setpoint 566 and/or a PWM duty cycle from main actuator controller 536. PWM speed controller 538 may generate PWM output 554 (e.g., a PWM DC voltage output) and provide PWM output 554 to motor drive inverter 548. The duty cycle of PWM output 554 may determine the speed of rotation for BLDC motor 550. The width of the output PWM pulses can be adjusted by PWM speed controller 538 to achieve varying commanded motor speeds and/or to obtain varying motor or actuator positions.

Figure 9:
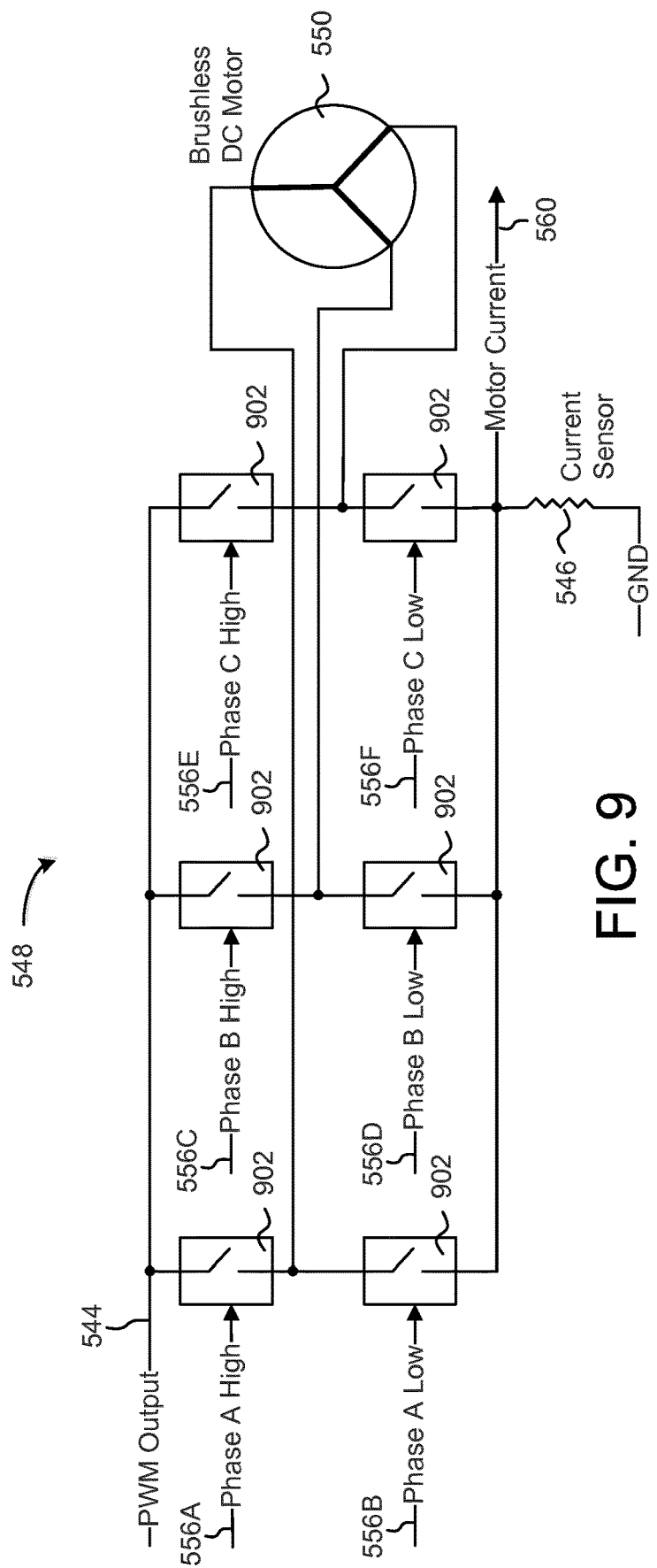
FIG. 9 is a circuit diagram illustrating a motor drive inverter circuit which can be used in the actuator of FIGS. 5-7, according to some embodiments.

In some embodiments, PWM speed controller 538 provides phase switch outputs 556 to motor drive inverter 548. Phase switch outputs 556 can be used by motor driver inverter 548 to control the polarity of the PWM output 554 provided to the windings of BLDC motor 550. In some embodiments, motor drive inverter 548 is an H-bridge. Some embodiments of such an H-bridge is shown in FIG. 9. While an H-bridge is shown in drawings, other switching circuits or controls can be used to controllably vary the phase switching in synchronization with the desired speed or rotation of BLDC motor 550.

In some embodiments, main actuator controller 536 uses a soft stall technique to control speed setpoint 566 (and the PWM output 554 resulting from speed setpoint 566) when actuator 500 approaches an end stop. For example, main actuator controller 536 may use position signals 558 to determine the current rotational position of drive device 510. When drive device 510 is within a predetermined distance from a known end stop location, main actuator controller 536 may set speed setpoint 566 to zero, which causes PWM speed controller 538 to set PWM output 554 to zero and ultimately stops motor commutation. Main actuator controller 536 may then ramp-up speed setpoint 566, which causes PWM speed controller 538 to ramp-up PWM output 554 and increases the speed of BLDC motor 550 as drive device 510 approaches the end stop. The soft stall control technique is described in greater detail in U.S. patent application Ser. No. 14/809,119 filed Jul. 24, 2015, the entirety of which is incorporated by reference herein.

Unlike conventional techniques which merely slow down the speed of the motor as the actuator approaches an end stop, the soft stall technique performed by main actuator controller 536 completely stops motor commutation. Once BLDC motor 550 has completely stopped, main actuator controller 536 causes a ramp-up of the PWM output 554, which increases the speed of BLDC motor 550 until the mechanical end of travel is reached. As such, main actuator controller 536 does not slow down the speed of BLDC motor 550 while approaching an end stop, but rather completely stops BLDC motor 550 and then increases the speed of BLDC motor 550 until the end stop is reached. The soft stall technique may reduce the impulse force seen at the mechanical end stop, thereby increasing the longevity of the mechanical gear train without the need to change the physical gearbox design.

In some embodiments, main actuator controller 536 is configured to perform an automatic stroke length recalibration sequence to recalibrate the end stop locations of actuator 500. For example, main actuator controller 536 may identify expected end stop locations, which can be stored in memory 534 and/or received from an external data source. Main actuator controller 536 may use position signals 558 to identify actual end stop locations. The actual end stop locations can be the locations at which drive device 510 stops upon reaching a mechanical end of travel and/or an unexpected blockage which prevents further movement. If the expected end stop locations and the actual end stop locations do not match, main actuator controller 536 may determine and set recalibrated end stop locations. Main actuator controller 536 may use the recalibrated end stop locations to determine and set a recalibrated stroke length. Main actuator controller 536 may use the recalibrated stroke length along with an actuator position setpoint (e.g., a control signal 564) to determine an adjusted position setpoint. The adjusted position setpoint can be used by main actuator controller 536 instead of control signal 564 to determine an appropriate speed setpoint 566 for PWM speed controller 538. The automatic stroke length recalibration technique is described in greater detail in U.S. patent application Ser. No. 14/983,229 filed Dec. 29, 2015, the entirety of which is incorporated by reference herein.

Unlike conventional techniques that require operator input in order to recalibrate the stroke length of a drive device, main actuator controller 536 can be configured to automatically run an automatic stroke length recalibration sequence in order to identify the mechanical end stop locations for both counterclockwise and clockwise rotation. This sequence can be performed when drive device 510 encounters an unexpected end stop location. Drive device 510 may encounter unexpected end stop locations when the drive device stroke length is either shortened or lengthened for various reasons. For example, ice or other debris may build up in the mechanical path of travel, shortening the stroke length and preventing drive device 510 from reaching expected end stop locations. In other cases, wearing on the seat of a valve or compression on the seal of a damper may increase the stroke length, causing drive device 510 to exceed expected end stop locations. Main actuator controller 536 may automatically detect such occurrences and perform an automatic stroke length recalibration without requiring a user to initiate the recalibration. Once the stroke length has been recalibrated, the previously described soft stall technique can be implemented with the recalibrated end stop locations.

Still referring to FIG. 8, motor current sensor 546 can be coupled to motor drive inverter 548 in a manner that allows current sensor 546 to provide an output (e.g., a voltage output) that indicates the amount of the electric current 560 provided to BLDC motor 550 on any phase line. A reading representative of sensed current 560 can be provided from motor current sensor 546 to comparator 544. Comparator 544 can be a discrete electronics part or implemented as part of main actuator controller 536 or another controller that forms a part of processing circuit 530. Comparator 544 can be configured to compare motor current 560 to an electric current threshold 562.

If the motor current 560 from current sensor 546 exceeds the threshold 562, comparator 544 may output a reset signal 574 to PWM speed controller 538. The application of reset signal 574 may cause PWM speed controller 538 to turn off PWM output 554 (e.g., by changing PWM output 554 to a duty cycle of 0%, setting PWM output 554 to zero, etc.) for a period of time or until comparator 544 indicates that motor current 560 no longer exceeds threshold 562. In other words, if the current threshold 562 for BLDC motor 550 is exceeded, comparator 544 can begin to interfere with PWM output 554 (e.g., by holding PWM output 554 in an off state), thereby causing BLDC motor 550 to slow down. Since the torque provided by BLDC motor 550 is proportional to motor current 560, both the electric current and torque of BLDC motor 550 can be limited by the application of reset signal 574.

The current threshold 562 can be controlled by main actuator controller 536. For example, threshold 562 may start as a digital value stored within main actuator controller 536 (e.g., a maximum torque threshold 568 or a maximum current threshold 570). Main actuator controller 536 may control threshold 562 by adjusting the thresholds 568 and/or 570 provided to PWM torque controller 540. Main actuator controller 536 may increase threshold 562 by increasing the maximum torque threshold 568 and/or the maximum current threshold 570. Main actuator controller 536 may decrease threshold 562 by decreasing the maximum torque threshold 568 and/or the maximum current threshold 570.

PWM torque controller 540 can be configured to generate a PWM output 572 based on the maximum torque 568 and/or maximum current 570 provided by main actuator controller 536. PWM torque controller 540 may convert the thresholds 568 and/or 570 to a PWM output 572 and provide the PWM output 572 to filter 542. Filter 542 can be configured to convert the PWM output 572 from PWM torque controller 540 into a current threshold 562 (e.g., a DC voltage representative of an electric current) for comparison to the output of current sensor 546 using a filter 542. In some embodiments, filter 542 is a first order low pass filter having a resistor in series with the load and a capacitor in parallel with the load. In other embodiments, filter 542 can be a low pass filter of a different order or a different type of filter.

In some embodiments, the threshold 562 provided to comparator 544 is based on a temperature sensor input. As the temperature sensor input varies (e.g., based on the changing ambient temperature, based on a temperature of a motor element, etc.), main actuator controller 536 may cause the threshold 562 to be adjusted. For example, as the temperature sensor input changes, main actuator controller 536 may adjust the thresholds 568 and/or 570 provided to PWM torque controller 540. Adjusting the thresholds 568 and/or 570 provided to PWM torque controller 540 may cause the duty cycle of PWM output 572 to change, which causes a corresponding change in the current threshold 562 output by filter 542.

In various embodiments, threshold 562 can be adjusted automatically by main actuator controller 536, adjusted by a user, or can be a static value. In some embodiments, threshold 562 is a static or dynamic value based on one or more variables other than ambient temperature. For example, threshold 562 can be set to a value that corresponds to the maximum current that can safely be provided to BLDC motor 550 or a maximum torque that can safely be provided by BLDC motor 550 to drive device 510.

In some embodiments, motor current 560 is communicated to an external system or device via communications circuit 580. The external system or device may include, for example, an economizer controller, a supervisory controller, a BMS controller, a zone controller, a field controller, an enterprise level controller, a motor controller, an equipment-level controller, a user device, a mobile device, cloud-based data storage, or any other type of system or device capable of receiving data from actuator 500 via communications circuit 580. The external system or device may use motor current 560 to predict damper failure, described in greater detail with reference to FIGS. 13A-15.

Referring now to FIG. 9, motor drive inverter 548, BLDC motor 550, and current sensor 546 are shown in greater detail, according to some embodiments. Motor drive inverter 548 is shown to receiving PWM output 554 and phase switch outputs 556 for each of three phase lines of BLDC motor 550. Phase switch outputs 556 are shown to include a "Phase A High" output 556A, a "Phase A Low" output 556B, a "Phase B High" output 556C, a "Phase B Low" output 556D, a "Phase C High" output 556E, and a "Phase C Low" output 556F. Phase switch outputs 556 can be provided to switching elements 902. Switching elements 902 can be transistors configured to allow or deny current to flow through switching elements 902 from PWM output 554. Current sensor 546 is shown as a current sense resistor and can be configured to sense the motor current 560 provided to BLDC motor 550 regardless of the active winding.

Figure 10:
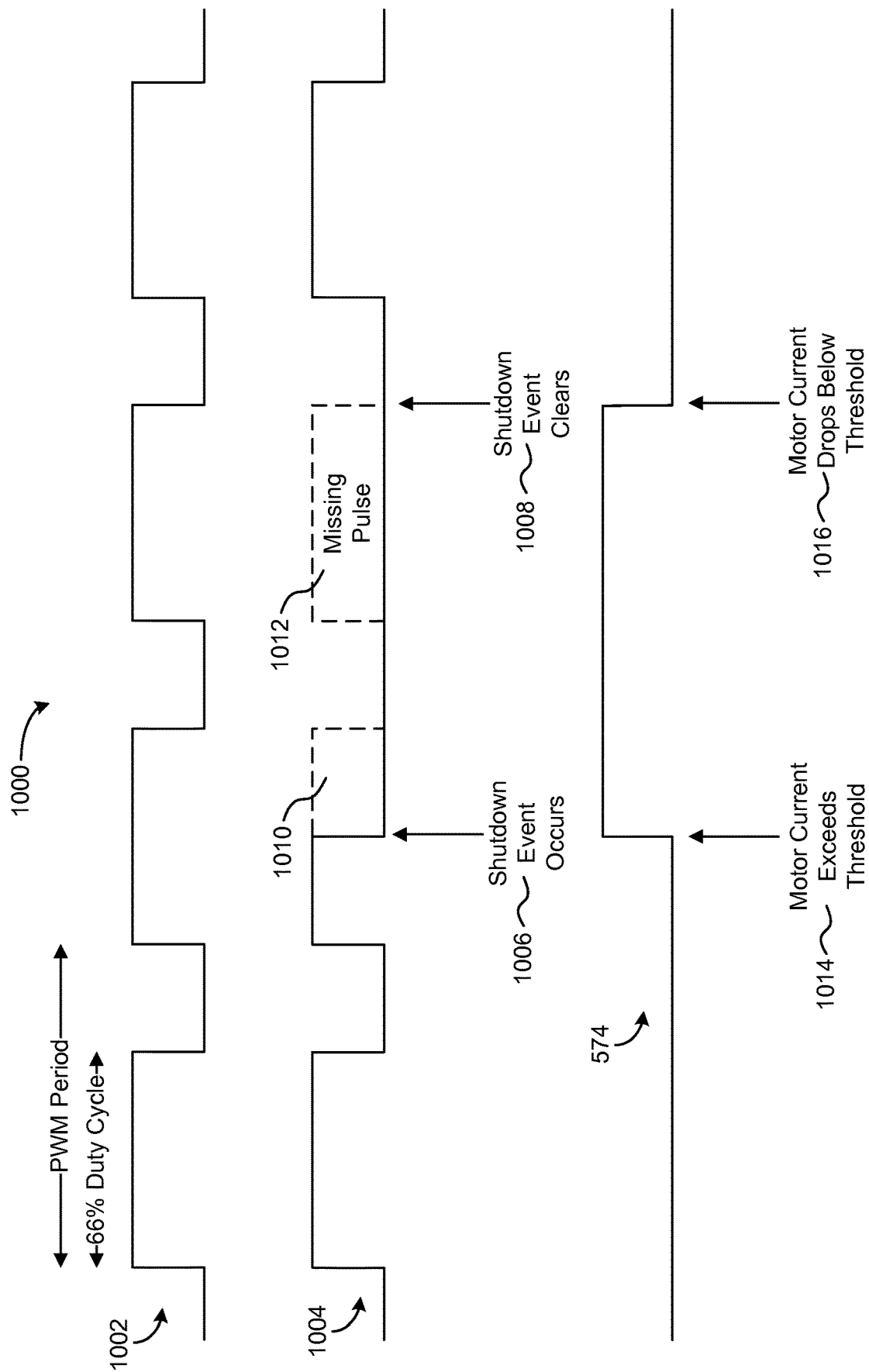
FIG. 10 is an illustration of a pulse width modulation (PWM) shutdown technique which can be used by the actuator of FIGS. 5-7 to limit the electric current through a motor of the actuator when the electric current exceeds a threshold, according to some embodiments.

Referring now to FIG. 10, an illustration 1000 of the speed and torque control technique used by processing circuit 530 is shown, according to some embodiments. Illustration 1000 includes a normal PWM output 1002 and an affected PWM output 1004. Normal PWM output can be provided as PWM output 554 by PWM speed controller 538 in the absence of a reset signal 574. Normal PWM output 1002 has a steady 66% duty cycle, which causes BLDC motor 550 to run at a particular speed. PWM output 1004 can be provided as PWM output 554 when a current overrun event is experienced. PWM output 1004 is an example of the PWM output 554 provided by PWM speed controller 538 in the presence of reset signal 574.

As shown in FIG. 10, the motor current 560 exceeds the threshold 562 at time 1014, which causes the reset signal 574 to change to a high value. When the reset signal 574 is high, PWM speed controller 538 may cause a shutdown event 1006 to occur. Shutdown event 1006 may include holding PWM output 1004 in an off state for the duration of the shutdown event. For example, PWM output 1004 is shown to include part of a first pulse 1010 and an entire missing pulse 1012 which are "off" rather than "on" due to the shutdown event 1006. This causes BLDC motor 550 to slow down, reduces motor current 560, and avoids prolonged or series overcurrent. When motor current 560 drops below the threshold 562 at time 1016, the shutdown event clears 1008 and PWM output 1004 continues as usual.

Figure 11:
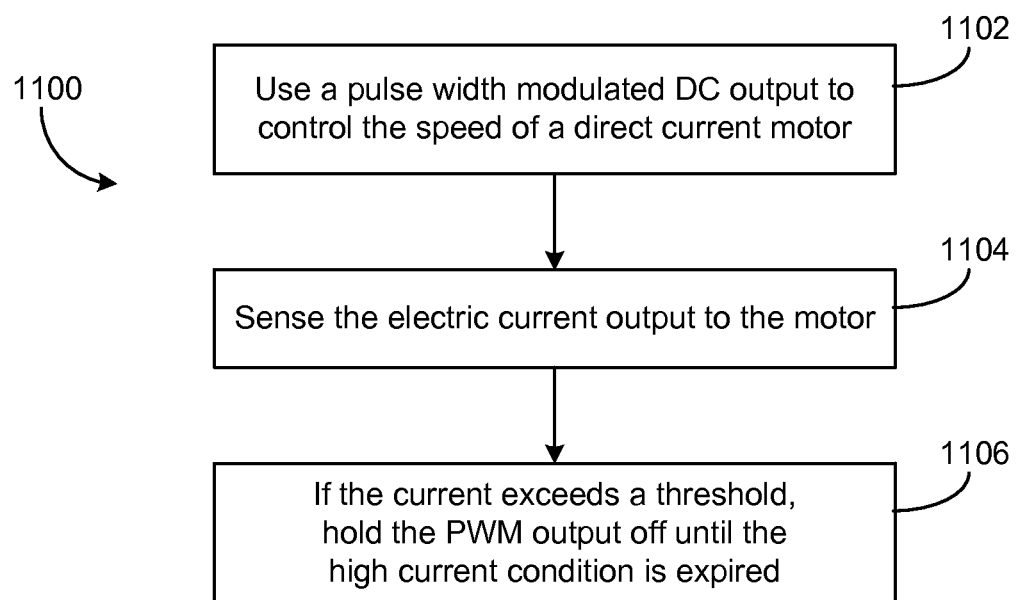
FIG. 11 is a flowchart of a torque control process which can be performed by the actuator of FIGS. 5-7 for controlling a direct current motor using PWM, according to some embodiments.

Referring now to FIG. 11, a flowchart of a process 1100 for operating a BLDC motor is shown, according to some embodiments. Process 1100 can be performed by processing circuit 530 of actuator 500 to operate BLDC motor 550. As shown in FIG. 8, BLDC motor 550 can be implemented within actuator 500. A microcontroller such as processing circuit 530 may particularly be configured to cause the steps of process 1100 to be executed. However, it should be appreciated that solid state electronic circuitry can be provided to perform the steps of process 1100 in place of a microcontroller.

Process 1100 is shown to include using a pulse width modulated DC output to control the speed of a direct current motor (step 1102). The direct current motor can be a BLDC motor such as BLDC motor 550. In some embodiments, step 1102 includes determining a speed or position setpoint for the BLDC motor and/or a drive device driven by the BLDC motor (e.g., drive device 510). In various embodiments, logic for determining the speed or position setpoint of the BLDC motor and/or the drive device can be embedded within processing circuit 530 or can be external to the actuator itself. In such instances, a setpoint can be provided to the actuator via an input connection (e.g., input connection 520). Processing circuit 530 can use pulse width modulation control to provide an appropriate PWM DC output for achieving the requested speed of the DC motor, as described with reference to FIG. 8.

Process 1100 is shown to include sensing the current output to the motor (step 1104). Sensing the current output to the motor may include using a current sensor (e.g., motor current sensor 546) to measure a voltage representative of the current output. The current output can be provided to the processing circuit.

Process 1100 is shown to include holding the PWM output in an off state if the sensed current exceeds a threshold (step 1106). Holding the PWM output in an off state may include refraining from sending any pulses to the DC motor. The PWM output can be resumed when the high current condition is expired. Expiration of the high current condition can be sensed (e.g., when the sensed current falls below the threshold) or can be estimated based on an elapsed time period.

Figure 12:
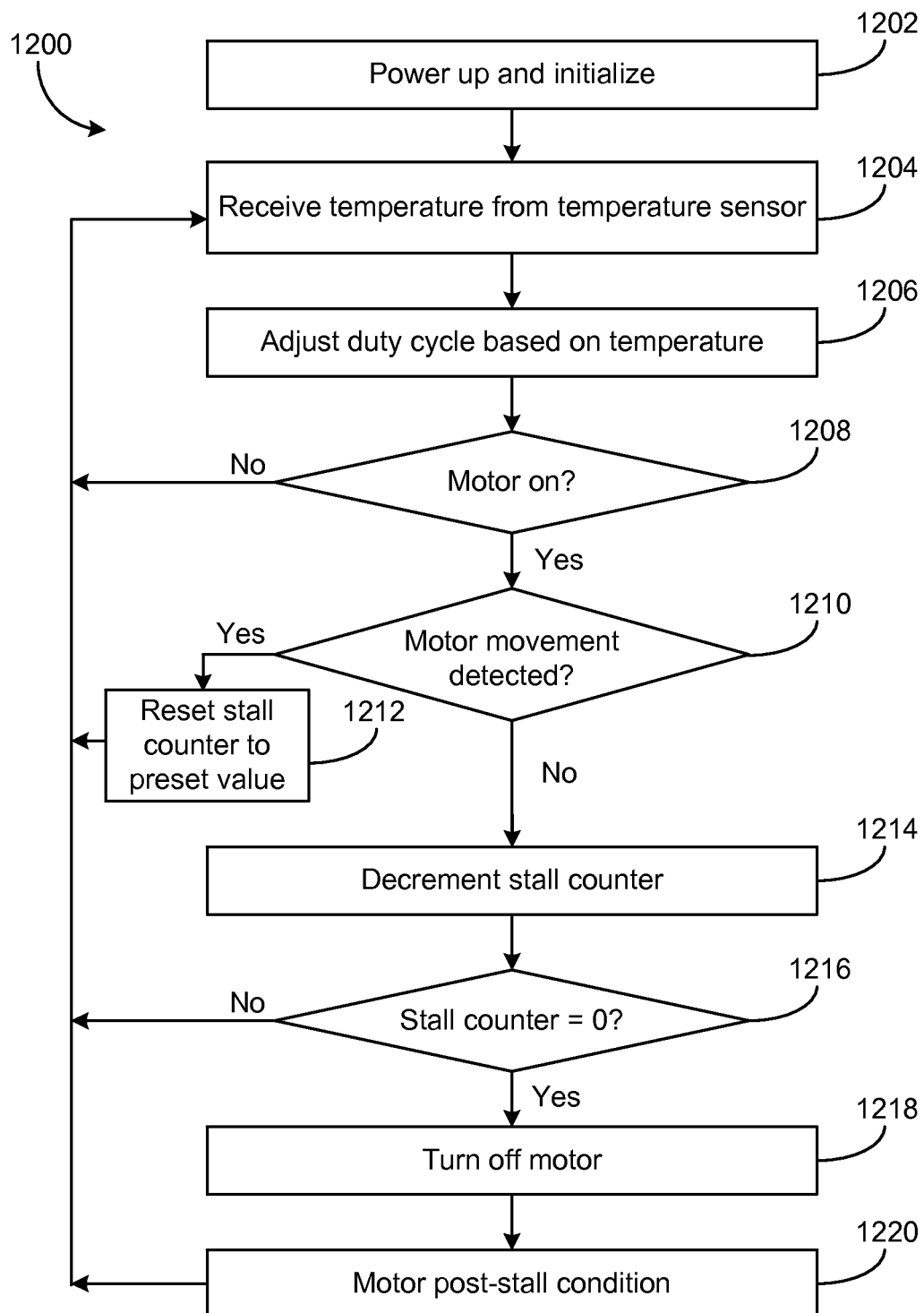
FIG. 12 is flowchart of another torque control process which can be performed by the actuator of FIGS. 5-7 for controlling a direct current motor using PWM, according to some embodiments.

Referring now to FIG. 12, another process 1200 for operating a DC motor is shown, according to some embodiments. Process 1200 can be performed by processing circuit 530 of actuator 500 to operate BLDC motor 550. Process 1200 is shown to include powering up and initializing (step 1202) and receiving a temperature reading from a temperature sensor (step 1204). Step 1202 may include recalling an initial duty cycle and recalling an initial stall counter state. In some embodiments, the initial stall counter state is a non-zero number. As described with reference to FIG. 8, the duty cycle of the PWM output 572 provided by PWM torque controller 540 can be adjusted based on the temperature (step 1206).

Process 1200 is shown to include determining if the motor is on (step 1208). If the motor is on, process 1200 may include checking if motor movement is detected (step 1210). Motor movement can be checked using one or more Hall sensors. If the motor is moving, the stall counter (e.g., the counter used to represent a stalled motor condition) can be reset to a default value and process 1200 can be reset to a predetermined value (step 1212). If the motor is currently stalled, the stall counter can be decremented (step 1214) but not stopped (e.g., allowing for a temporary stall).

Process 1200 is shown to include determining whether the stall counter reaches zero (step 1216). When the stall counter reaches zero, the motor can be turned off (step 1218) and the motor enters a post-stalling condition (step 1220). The post stall condition may include resuming operation once the stall condition is cleared (e.g., movement is detected). In some embodiments, process 1200 can run in parallel to the processes for operation described herein that rely on holding PWM in an off state during an over current condition (overcurrent can be caused by stalls). In other embodiments, process 1200 can be run as one alternative to the process described with reference to FIGS. 8-11.

Predictive Equipment Failure

Figure 13A:
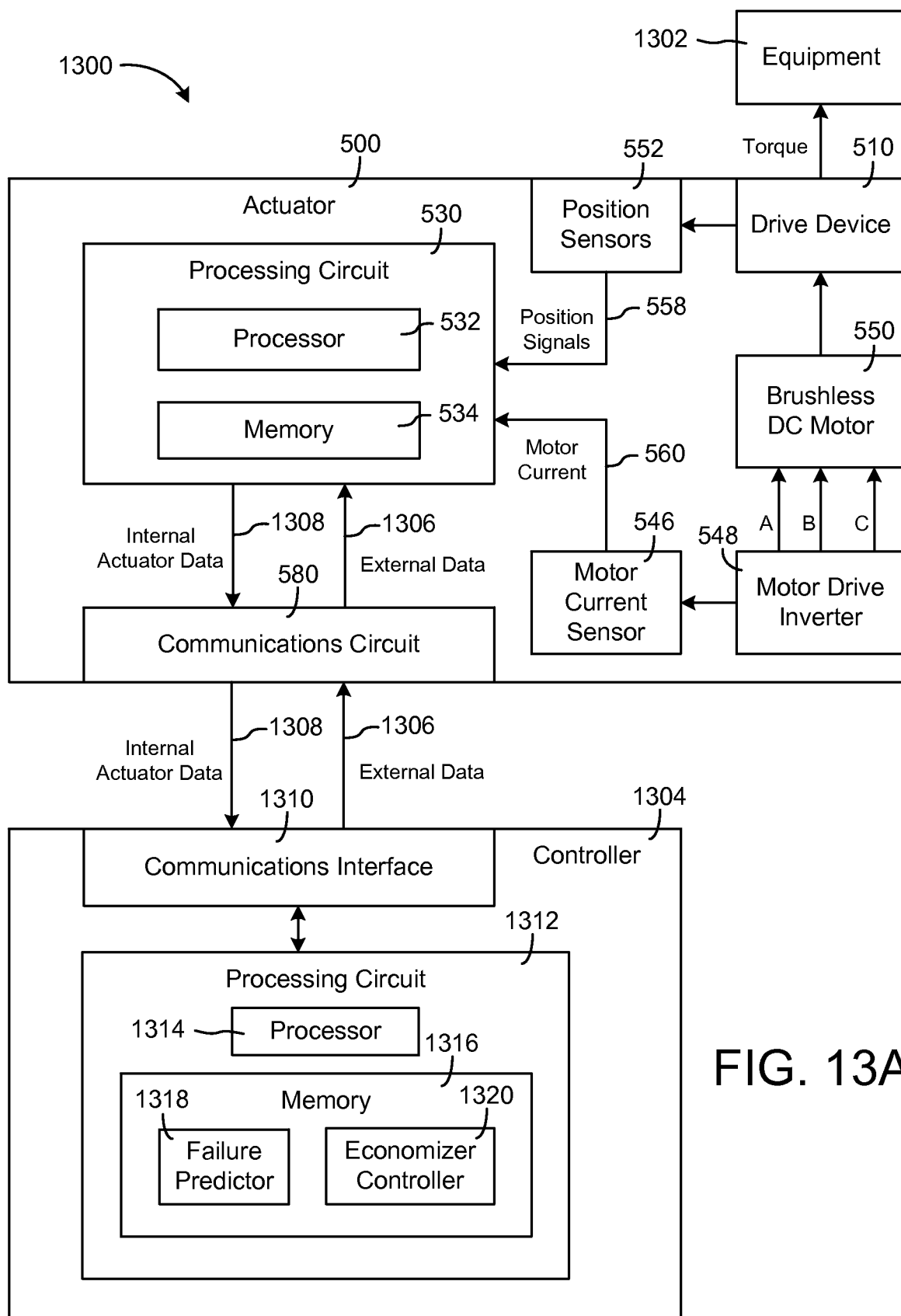
FIG. 13A is a block diagram of a system for predicting equipment failure in which internal actuator data is sent from the actuator to a failure predictor in an external controller, according to some embodiments.

Referring now to FIG. 13A, a system 1300 for predicting equipment failure is shown, according to some embodiments. System 1300 is shown to include actuator 500, equipment 1302, and a controller 1304. Actuator 500 can be the same as previously described with reference to FIGS. 5-12. For example, actuator 500 is shown to include a drive device 510 driven by a BLDC motor 550 and a motor drive inverter 548. Motor drive inverter 548 may receive a PWM output signal and/or phase switch outputs from processing circuit 530 and may provide a three-phase PWM voltage output to BLDC motor 550. BLDC motor 550 drives drive device 510, which can be connected to equipment 1302. Equipment 1302 can include any type of system or device that can be operated by an actuator (e.g., a damper, a valve, a robotic arm, etc.). Drive device 510 may apply a torque or force to equipment 1302 which causes equipment 1302 to move between an open position and a closed position. In some embodiments, the torque or force applied to equipment 1302 is proportional to the electric current provided to BLDC motor 550.

Motor current sensor 546 (e.g., a current sense resistor) can be configured to sense the electric current provided to BLDC motor 550 and may provide an indication of the motor current 560 to processing circuit 530. Position sensors 552 can be configured to measure the rotational position of BLDC motor 550 and/or drive device 510 and may provide position signals 558 to processing circuit 530. Processing circuit 530 may operate as previously described to control BLDC motor 550 based on position signals 558, motor current 560, and/or external data 1306 received via communications circuit 580. External data 1306 may include, for example, position setpoints, speed setpoints, control signals, configuration parameters, end stop locations, stroke length parameters, commissioning data, equipment model data, actuator firmware, actuator software, or any other type of data which can be used by actuator 500 to operate BLDC motor 550 and/or drive device 510.

Communications circuit 580 can be configured to support a variety of data communications between actuator 500 and external systems or devices (e.g., controller 1304). Communications circuit 580 can be a wired or wireless communications link and may use any of a variety of disparate communications protocols (e.g., BACnet, LON, WiFi, Bluetooth, NFC, TCP/IP, etc.). In some embodiments, communications circuit 580 is an integrated circuit, chip, or microcontroller unit (MCU) separate from processing circuit 530 and configured to bridge communications between processing circuit 530 and external systems or devices. Communications circuit 580 is described in greater detail with reference to FIGS. 16-17. An example of a communications circuit which can be used as communications circuit 580 is described in detail in U.S. patent application Ser. No. 15/207,431 filed Jul. 11, 2016, the entire disclosure of which is incorporated by reference herein.

Communications circuit 580 may receive internal actuator data 1308 from processing circuit 530 and may provide internal actuator data 1308 to controller 1304. Internal actuator data 1308 may include any type of signal, variable, or parameter used by actuator 500. For example, internal actuator data 1308 may include the sensed motor current 560, a measured or calculated motor torque, the actuator position or speed, configuration parameters, end stop locations, stroke length parameters, commissioning data, equipment model data, firmware versions, software versions, time series data, a cumulative number of stop/start commands, a total distance traveled, an amount of time required to open/close equipment 1302, or any other type of data used or stored internally within actuator 500. Conventional actuators typically only output a feedback signal indicating the actuator position, but do not output or report any other types of data. However, communications circuit 580 enables actuator 500 to output a variety of different types of internal actuator data 1308. Internal actuator data 1308 can be provided to controller 1304 or any other system or device (e.g., local or cloud-based data storage, enterprise control applications, user devices, a building management system, etc.).

Controller 1304 can be an AHU controller (e.g., AHU controller 330), an economizer controller, a supervisory controller (e.g., BMS controller 366), a zone controller, a field controller, an enterprise level controller, a user device, or any other type of system or device configured to control actuator 500. Controller 1304 may provide external data 1306 (e.g., control signals) to actuator 500 and may receive internal actuator data 1308 from actuator 500. Controller 1304 can use internal actuator data 1308 to perform diagnostics, detect faults, and/or monitor the performance of actuator 500 over time. In some embodiments, controller 1304 uses internal actuator data 1308 to predict equipment failure (described in greater detail below).

In some embodiments, controller 1304 and actuator 500 are separate devices, as shown in FIG. 13A. In other embodiments, controller 1304 can be a component of actuator 500. For example, actuator 500 can have a control module in memory 534 configured to perform the functions of controller 1304. In this embodiment, internal actuator data 1308 need not be transmitted outside actuator 500, but rather can be used internally by actuator 500 to predict equipment failure. In some embodiments, a subset of the components of controller 1304 are components of actuator 500. For example, failure predictor 1318 can be a component of actuator 500, whereas economizer controller 1320 can be a component of controller 1304. This embodiment is described in greater detail with reference to FIG. 13B.

Still referring to FIG. 13A, controller 1304 is shown to include a communications interface 1310 and a processing circuit 1312. Communications interface 1310 can include wired or wireless interfaces (e.g., jacks, antennas, transmitters, receivers, transceivers, wire terminals, etc.) for conducting data communications with actuator 500 and/or other external systems or devices. Communications via interface 1310 can be direct (e.g., local wired or wireless communications) or via a communications network (e.g., a LAN, a WAN, the Internet, a cellular network, a BACnet network, etc.). For example, communications interface 1310 can include an Ethernet card and port for sending and receiving data via an Ethernet-based communications link or network. In another example, communications interface 1310 can include a WiFi transceiver, Zigbee transceiver, NFC transceiver, cellular transceiver, or Bluetooth transceiver for communicating via a wireless communications network.

Processing circuit 1312 is shown to include a processor 1314 and memory 1316. Processor 1314 can be a general purpose or specific purpose processor, an application specific integrated circuit (ASIC), one or more field programmable gate arrays (FPGAs), a group of processing components, or other suitable processing components. Processor 1314 can be configured to execute computer code or instructions stored in memory 1316 or received from other computer readable media (e.g., CDROM, network storage, a remote server, etc.).

Memory 1316 may include one or more devices (e.g., memory units, memory devices, storage devices, etc.) for storing data and/or computer code for completing and/or facilitating the various processes described in the present disclosure. Memory 1316 may include random access memory (RAM), read-only memory (ROM), hard drive storage, temporary storage, non-volatile memory, flash memory, optical memory, or any other suitable memory for storing software objects and/or computer instructions. Memory 1316 may include database components, object code components, script components, or any other type of information structure for supporting the various activities and information structures described in the present disclosure. Memory 1316 can be communicably connected to processor 1314 via processing circuit 1312 and may include computer code for executing (e.g., by processor 1314) one or more processes described herein. When processor 1314 executes instructions stored in memory 1316, processor 1314 generally configures controller 1304 (and more particularly processing circuit 1312) to complete such activities.

Still referring to FIG. 13A, controller 1304 is shown to include a failure predictor 1318 and an economizer controller 1320. In various embodiments, failure predictor 1318 and economizer controller 1320 can be hardware modules or software modules located within memory 1316. Economizer controller 1320 can be configured to operate actuator 500 using an economizer control technique. Economizer controller 1320 can be configured to use any of a variety of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control operation of an airside economizer. An example of an airside economizer which can be controlled by economizer controller 1320 is described with reference to FIG. 3. Another example of an airside economizer which can be controlled by economizer controller 1320 is described in detail in the non-patent publication "Design Brief: Economizers" by Energy Design Resources (i.e., "the Economizer Design Brief") available at the following URL: https://energydesignresources.com/media/2919091/edr_designbrief_economizers.pdf. The entire disclosure of the Economizer Design Brief is incorporated by reference herein.

In some embodiments, economizer controller 1320 operates a plurality of actuators, each of which is connected to different equipment 1302. In some embodiments, each actuator is configured to open and close a different damper. For example, economizer controller 1320 can be configured to operate actuators connected to an exhaust air damper, an outside air damper, a mixing air damper, a supply air damper, a return air damper, and/or any other dampers which can be used in an airside economizer. In some embodiments, the actuators are configured to operate a fluid control valve, a mechanical device, or other types of controllable equipment. Economizer controller 1320 may receive input from temperature sensors (e.g., building temperature sensors, supply air temperature sensors, outside air temperature sensors, etc.), airflow sensors, pressure sensors, and/or other types of sensors. Economizer controller 1320 may provide control signals to actuator 500 (i.e., a type of external data

1306). The control signals may cause actuator 500 to adjust the position of equipment 1302. In some embodiments, economizer controller 1320 controls various dampers, heating coils, cooling coils, fluid control valves, and/or other devices to achieve a supply air temperature setpoint according to economizer control logic.

Failure predictor 1318 can be configured to predict the failure of equipment 1302 using internal actuator data 1308 received from actuator 500. Equipment failure may occur when actuator 500 is unable to move equipment 1302, which can result in equipment 1302 becoming stuck (e.g., stuck open, stuck closed, or stuck an intermediate position). Equipment failure can be caused by increased frictional wear and/or degradation of linkages and equipment components over time. Such wear and degradation can be accelerated by corrosive salt air if equipment 1302 is installed in a marine environment. For example, corrosive salt air can cause degradation of damper components over time as the corrosive salt air passes through an airflow damper. In other embodiments, equipment 1302 is a fluid control valve. Equipment degradation can occur as a result of the buildup of minerals, contaminants, dissolved or suspended solids, or other substances within the fluid control valve. For example, contaminated water can degrade valve components over time as the contaminants accumulate within the valve or corrode the valve components.

Actuator 500 can be configured to compensate for increased friction (i.e., increased resistance to movement) by increasing the electric current provided to BLDC motor 550. Increasing the electric current provided to BLDC motor 550 causes BLDC motor 550 to apply an increased torque to drive device 510 and equipment 1302. Such compensation can be effective until the torque required to move equipment 1302 exceeds a torque threshold (e.g., a maximum torque capable of being generated by BLDC motor 550, a torque capacity limit, a torque safety limit, etc.), at which point BLDC motor 550 stalls and equipment 1302 becomes stuck.

Another failure mode can occur when the electric current provided to BLDC motor 550 exceeds a current threshold. For example, actuator 500 can be configured to automatically cut power to BLDC motor 550 when the motor current exceeds a threshold to prevent damage, as described with reference to FIG. 8. Accordingly, actuator 500 can be unable to increase the motor current past the current threshold. If the motor current required to overcome the increased friction exceeds the current threshold, equipment 1302 can become stuck.

In some embodiments, failure predictor 1318 is configured to predict a time at which equipment failure will occur based on measurements of the motor current and/or the motor torque received from actuator 500 as internal actuator data 1308. Failure predictor 1318 can be configured to monitor the motor current and/or the motor torque over time to determine a rate at which the nominal motor current and/or the nominal motor torque is increasing. The nominal motor current can be defined as the average motor current 560 while equipment 1302 is moving between positions. Similarly, the nominal motor torque can be defined as the average torque applied to equipment 1302 while equipment 1302 is moving between positions. Failure predictor 1318 can calculate the motor torque based on measurements of the motor current or can receive the motor torque as an output from actuator 500.

In some embodiments, failure predictor 1318 uses a regression technique to fit a line or curve to a set of data points indicating the nominal motor current and/or the nominal motor torque over time. Such data points can be collected (e.g., measured, calculated, etc.) over a time period that spans days, weeks, months, or years. Failure predictor 1318 can project or extrapolate the nominal motor current and/or the nominal motor torque forward in time to predict the motor current and/or the motor torque into the future. Failure predictor 1318 can determine a time at which the predicted motor current and/or the predicted motor torque exceeds a threshold value (e.g., a torque threshold, a current threshold, etc.). Failure predictor 1318 can identify the time at which the predicted motor current and/or the predicted motor torque exceeds the threshold value as the predicted failure time.

In other embodiments, failure predictor 1318 can predict the equipment failure time using other types of internal actuator data 1308 received from actuator 500. For example, failure predictor 1318 can receive a total number of open/close commands, a total distance traveled, and/or an amount of time required for equipment 1302 to move between an open position and a closed position as internal actuator data 1308. Failure predictor 1318 can monitor the total number of open/close commands over time to determine a rate at which the total number of open/close commands is increasing. Failure predictor 1318 can predict a time at which the total number of open/close commands will exceed a threshold value based on the determined rate of change. Similarly, failure predictor 1318 can monitor the total distance traveled, the amount of time required to move between open and closed positions over time, and/or a rate at which such variables are increasing. Failure predictor 1318 can predict a time at which the total distance traveled and/or the amount of time required to move between open and closed positions will exceed a threshold value based on the determined rate of change.

In some embodiments, failure predictor 1318 performs the failure prediction in response to the measured motor current and/or motor torque exceeding a warning threshold (e.g., 75% of the failure threshold, 85% of the failure threshold, etc.). Failure predictor 1318 can generate a warning message that includes the predicted failure time and can provide the warning message as an output to a user device. The warning message may indicate that the motor current and/or motor torque has exceeded the warning threshold and that equipment failure is predicted to occur at the predicted failure time. In some embodiments, the warning message prompts the user to repair or replace equipment 1302 before failure occurs (i.e., before the predicted failure time). For example, the warning message may include contact information for a repair service (e.g., a telephone number or website URL), information for ordering replacement parts, and/or other types of information that can assist the user in preemptively repairing or replacing equipment 1302 before failure occurs.

Figure 13B:
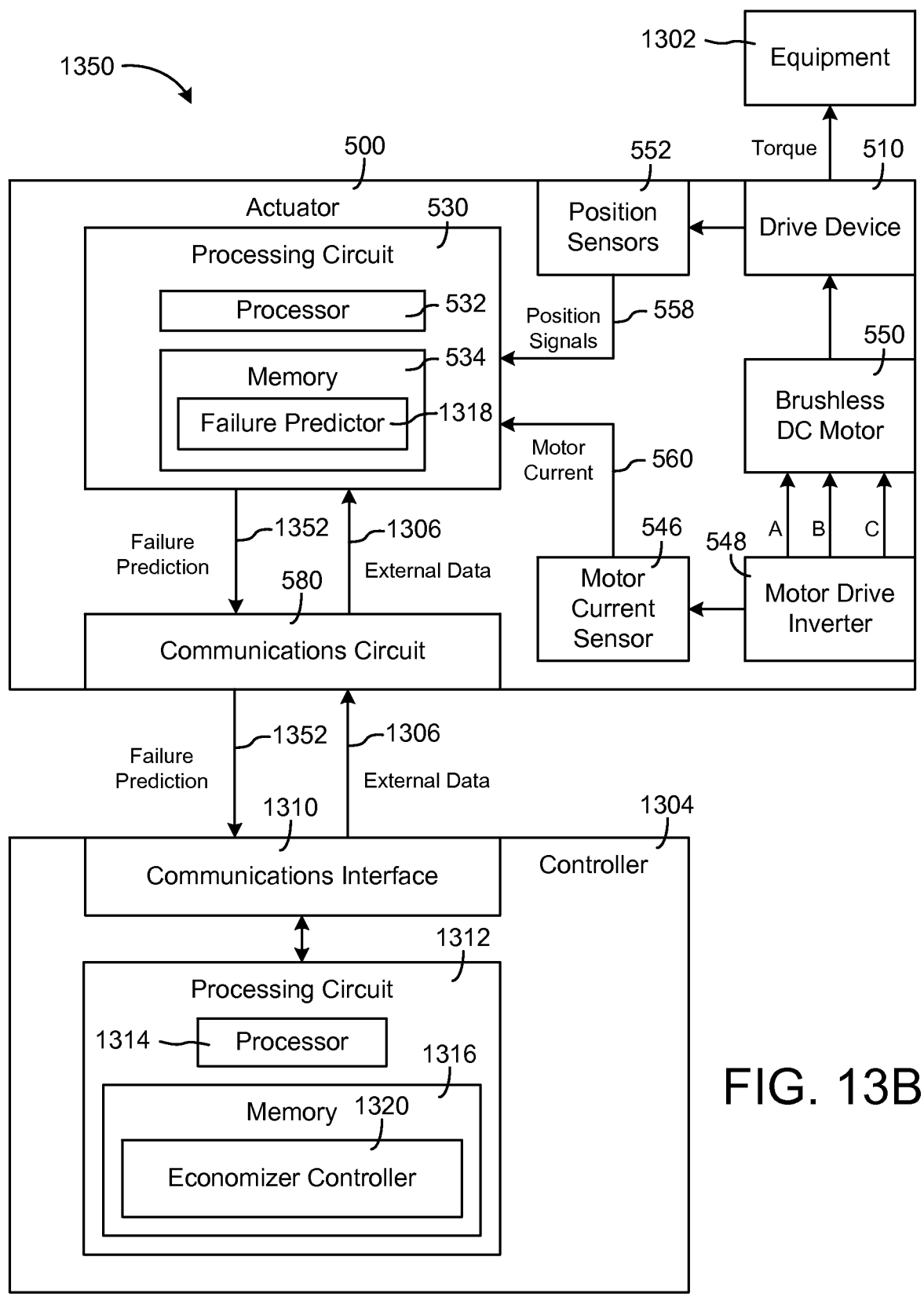
FIG. 13B is a block diagram of another system for predicting equipment failure in which the failure predictor is a component of the actuator, according to some embodiments.

Referring now to FIG. 13B, another system 1350 for predicting equipment failure is shown, according to some embodiments. System 1350 may include many of the same components as system 1300. For example, system 1350 is shown to include actuator 500, equipment 1302, and a controller 1304. However, in system 1350, failure predictor 1318 is shown as a component of actuator 500 rather than a component of controller 1304. Failure predictor 1318 can use the internal actuator data within processing circuit 530 to generate a failure prediction 1352 and can communicate failure prediction 1352 to controller 1304 via communications circuit 580.

The other components of actuator 500 can be the same as previously described with reference to FIGS. 5-13A. For example, actuator 500 is shown to include a drive device 510 driven by a BLDC motor 550 and a motor drive inverter 548. Motor drive inverter 548 may receive a PWM output signal and/or phase switch outputs from processing circuit 530 and may provide a three-phase PWM voltage output to BLDC motor 550. BLDC motor 550 drives drive device 510, which can be connected to equipment 1302. Equipment 1302 can include any type of system or device that can be operated by an actuator (e.g., a damper, a valve, a robotic arm, etc.). Drive device 510 may apply a torque or force to equipment 1302 which causes equipment 1302 to move between an open position and a closed position. In some embodiments, the torque or force applied to equipment 1302 is proportional to the electric current provided to BLDC motor 550.

Motor current sensor 546 (e.g., a current sense resistor) can be configured to sense the electric current provided to BLDC motor 550 and may provide an indication of the motor current 560 to processing circuit 530. Position sensors 552 can be configured to measure the rotational position of BLDC motor 550 and/or drive device 510 and may provide position signals 558 to processing circuit 530. Processing circuit 530 may operate as previously described to control BLDC motor 550 based on position signals 558, motor current 560, and/or external data 1306 received via communications circuit 580. External data 1306 may include, for example, position setpoints, speed setpoints, control signals, configuration parameters, end stop locations, stroke length parameters, commissioning data, equipment model data, actuator firmware, actuator software, or any other type of data which can be used by actuator 500 to operate BLDC motor 550 and/or drive device 510.

Communications circuit 580 can be configured to support a variety of data communications between actuator 500 and external systems or devices (e.g., controller 1304). Communications circuit 580 can be a wired or wireless communications link and may use any of a variety of disparate communications protocols (e.g., BACnet, LON, WiFi, Bluetooth, NFC, TCP/IP, etc.). In some embodiments, communications circuit 580 is an integrated circuit, chip, or microcontroller unit (MCU) separate from processing circuit 530 and configured to bridge communications between processing circuit 530 and external systems or devices. Communications circuit 580 is described in greater detail with reference to FIGS. 16-17. An example of a communications circuit which can be used as communications circuit 580 is described in detail in U.S. patent application Ser. No. 15/207,431 filed Jul. 11, 2016, the entire disclosure of which is incorporated by reference herein.

Failure predictor 1318 may receive internal actuator data 1308 from processing circuit 530. Internal actuator data 1308 may include any type of signal, variable, or parameter used by actuator 500. For example, internal actuator data 1308 may include the sensed motor current 560, a measured or calculated motor torque, the actuator position or speed, configuration parameters, end stop locations, stroke length parameters, commissioning data, equipment model data, firmware versions, software versions, time series data, a cumulative number of stop/start commands, a total distance traveled, an amount of time required to open/close equipment 1302, or any other type of data used or stored internally within actuator 500.

Failure predictor 1318 can use internal actuator data 1308 to generate a failure prediction 1352 and may provide failure prediction 1352 to controller 1304. Conventional actuators typically only output a feedback signal indicating the actuator position, but do not output or report any other types of data. However, communications circuit 580 enables actuator 500 to output a failure prediction 1352. Failure prediction 1352 can be provided to controller 1304 or any other system or device (e.g., local or cloud-based data storage, enterprise control applications, user devices, a building management system, etc.).

The operation of failure predictor 1318 in system 1350 may be the same or similar to the operation of failure predictor 1318 in system 1300. For example, failure predictor 1318 can be configured to predict a time at which equipment failure will occur based on measurements of the motor current and/or the motor torque received from actuator 500 as internal actuator data 1308. Failure predictor 1318 can be configured to monitor the motor current and/or the motor torque over time to determine a rate at which the nominal motor current and/or the nominal motor torque is increasing. The nominal motor current can be defined as the average motor current 560 while equipment 1302 is moving between positions. Similarly, the nominal motor torque can be defined as the average torque applied to equipment 1302 while equipment 1302 is moving between positions. Failure predictor 1318 can calculate the motor torque based on measurements of the motor current or can receive the motor torque as an output from actuator 500.

In some embodiments, failure predictor 1318 uses a regression technique to fit a line or curve to a set of data points indicating the nominal motor current and/or the nominal motor torque over time. Such data points can be collected (e.g., measured, calculated, etc.) over a time period that spans days, weeks, months, or years. Failure predictor 1318 can project or extrapolate the nominal motor current and/or the nominal motor torque forward in time to predict the motor current and/or the motor torque into the future. Failure predictor 1318 can determine a time at which the predicted motor current and/or the predicted motor torque exceeds a threshold value (e.g., a torque threshold, a current threshold, etc.). Failure predictor 1318 can identify the time at which the predicted motor current and/or the predicted motor torque exceeds the threshold value as the predicted failure time.

In other embodiments, failure predictor 1318 can predict the equipment failure time using other types of internal actuator data 1308 received from actuator 500. For example, failure predictor 1318 can receive a total number of open/close commands, a total distance traveled, and/or an amount of time required for equipment 1302 to move between an open position and a closed position as internal actuator data 1308. Failure predictor 1318 can monitor the total number of open/close commands over time to determine a rate at which the total number of open/close commands is increasing. Failure predictor 1318 can predict a time at which the total number of open/close commands will exceed a threshold value based on the determined rate of change. Similarly, failure predictor 1318 can monitor the total distance traveled, the amount of time required to move between open and closed positions over time, and/or a rate at which such variables are increasing. Failure predictor 1318 can predict a time at which the total distance traveled and/or the amount of time required to move between open and closed positions will exceed a threshold value based on the determined rate of change.

In some embodiments, failure predictor 1318 performs the failure prediction in response to the measured motor current and/or motor torque exceeding a warning threshold (e.g., 75% of the failure threshold, 85% of the failure threshold, etc.). Failure predictor 1318 can generate a warning message that includes the predicted failure time. Failure predictor 1318 can provide the warning message as an output to controller 1304 and/or a user device as a type of failure prediction 1352. The warning message may indicate that the motor current and/or motor torque has exceeded the warning threshold and that equipment failure is predicted to occur at the predicted failure time. In some embodiments, the warning message prompts the user to repair or replace equipment 1302 before failure occurs (i.e., before the predicted failure time). For example, the warning message may include contact information for a repair service (e.g., a telephone number or website URL), information for ordering replacement parts, and/or other types of information that can assist the user in preemptively repairing or replacing equipment 1302 before failure occurs.

Controller 1304 can be an AHU controller (e.g., AHU controller 330), an economizer controller, a supervisory controller (e.g., BMS controller 366), a zone controller, a field controller, an enterprise level controller, a user device, or any other type of system or device configured to control actuator 500. Controller 1304 may provide external data 1306 (e.g., control signals) to actuator 500 and may receive failure prediction 1352 from actuator 500. Controller 1304 can use failure prediction 1352 to perform diagnostics, detect faults, and/or monitor the performance of actuator 500 over time. In some embodiments, controller 1304 uses failure prediction 1352 to identify when equipment failure is predicted to occur.

Figure 14:
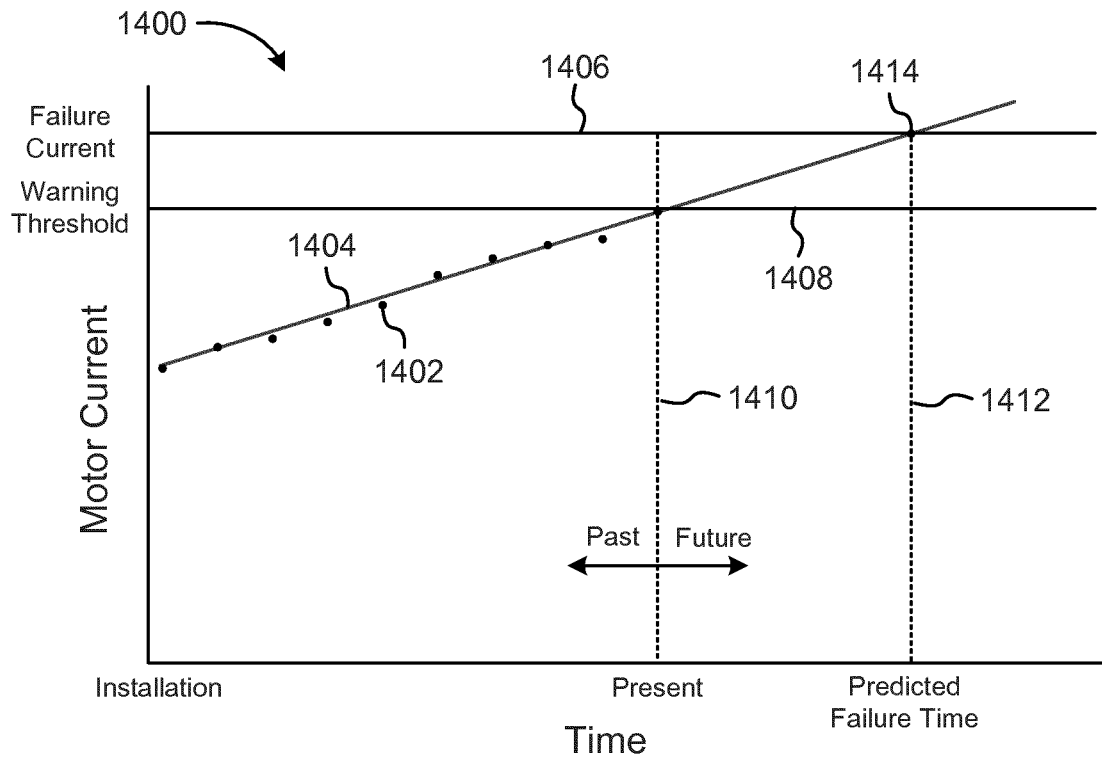
FIG. 14 is a graph illustrating a technique for predicting equipment failure by monitoring actuator motor current, according to some embodiments.
Figure 15:
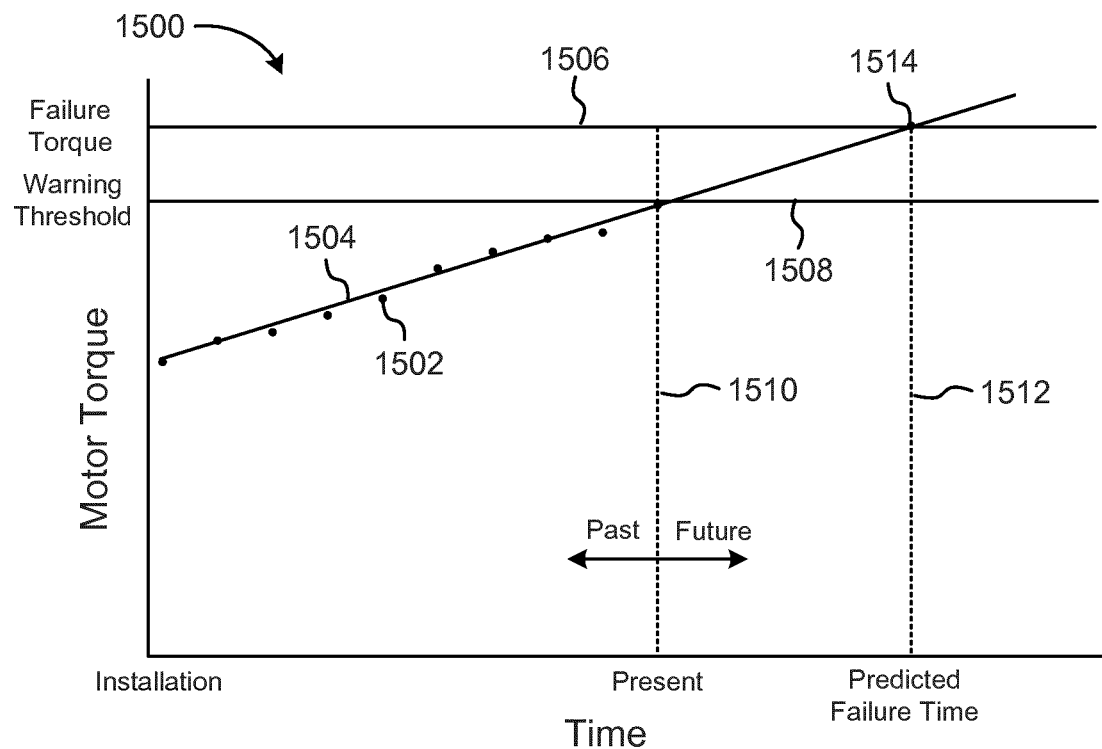
FIG. 15 is a graph illustrating a technique for predicting equipment failure by monitoring actuator motor torque, according to some embodiments.

Referring now to FIGS. 14-15, graphs 1400-1500 illustrating the operation of failure predictor 1318 are shown, according to some embodiments. Graph 1400 illustrates the operation of failure predictor 1318 when motor current is used to predict the equipment failure time, whereas graph 1500 illustrates the operation of failure predictor 1318 when motor torque is used to predict the equipment failure time. Although only motor current and motor torque are shown, it should be understood that other types internal actuator data 1308 can be used to predict equipment failure using similar techniques.

Referring particularly to FIG. 14, graph 1400 is shown to include several data points 1402 indicating the nominal motor current at various times. Data points 1402 can be measured by actuator 500 (e.g., by motor current sensor 546) and provided as an output from actuator 500 via communications circuit 580. In various embodiments, data points 1402 can be measured at regular intervals (e.g., hourly, daily, weekly, monthly, etc.) or measured each time actuator 500 is operated. Although only a few data points 1402 are shown in graph 1400, it is contemplated that data points 1402 can include significantly more data points depending on the frequency at which the nominal motor current is measured. For example, data points 1402 can include hundreds or thousands of data points in some embodiments.

Graph 1400 is shown to include a regression line 1404. Failure predictor 1318 can be configured to generate regression line 1404 by fitting a line or curve to the set of data points 1402. In some embodiments, regression line 1404 is a linear line, as shown in FIG. 14. In other embodiments, regression line can be a quadratic curve, a cubic curve, a logarithmic curve, or any other type of line or curve which can be fit to data points 1402. Regression line 1404 is shown to include a portion to the left of the present time line 1410 and a portion to the right of the present time line 1410. The portion of regression line 1404 to the right of present time line 1410 represents the predicted motor current for future times.

Graph 1400 is shown to include a failure current 1406 and a warning threshold 1408. Failure current 1406 can be a threshold current value representing the motor current that will cause equipment failure. For example, failure current 1406 can be the current threshold 562 that will cause actuator 500 to cut power to BLDC motor 550, as described with reference to FIG. 8. In some embodiments, failure current 1406 is a maximum rated current for BLDC motor 550 or a current that corresponds to the maximum torque that BLDC motor 550 is capable of generating (e.g., based on manufacturer specification). Warning threshold 1408 can be a predetermined percentage of the failure current 1406 (e.g., 75%, 85%, 90%, 95%, etc.). In some embodiments, failure predictor 1318 is configured to perform the failure prediction in response to the motor current exceeding warning threshold 1408.

Failure predictor 1318 may determine the point 1414 at which regression line 1404 exceeds the failure current 1406 (e.g., by calculating the point of intersection of regression line 1404 and the failure current 1406). Failure predictor 1318 may identify the time value of intersection point 1414 as the predicted failure time 1412. Failure predictor 1318 may store the predicted failure time 1412 in memory and/or output the predicted failure time 1412 to a user device as previously described.

Referring particularly to FIG. 15, graph 1500 is shown to include several data points 1502 indicating the nominal motor torque at various times. In some embodiments, data points 1502 are calculated by actuator 500 (e.g., using a proportional relationship between the measured motor current and the applied motor torque) and provided as an output from actuator 500 via communications circuit 580. In other embodiments, data points 1502 can be calculated by controller 1304 based on measurements of the motor current received from actuator 500. In various embodiments, data points 1502 can be obtained at regular intervals (e.g., hourly, daily, weekly, monthly, etc.) or each time actuator 500 is operated. Although only a few data points 1502 are shown in graph 1500, it is contemplated that data points 1502 can include significantly more data points depending on the frequency at which the nominal motor current and/or nominal motor torque is measured or calculated. For example, data points 1502 can include hundreds or thousands of data points in some embodiments.

Graph 1500 is shown to include a regression line 1504. Failure predictor 1318 can be configured to generate regression line 1504 by fitting a line or curve to the set of data points 1502. In some embodiments, regression line 1504 is a linear line, as shown in FIG. 15. In other embodiments, regression line can be a quadratic curve, a cubic curve, a logarithmic curve, or any other type of line or curve which can be fit to data points 1502. Regression line 1504 is shown to include a portion to the left of the present time line 1510 and a portion to the right of the present time line 1510. The portion of regression line 1504 to the right of present time line 1510 represents the predicted motor torque for future times.

Graph 1500 is shown to include a failure torque 1506 and a warning threshold 1508. Failure torque 1506 can be a threshold torque value representing the motor torque that will cause equipment failure. For example, failure torque 1506 can be the maximum rated torque for BLDC motor 550 the maximum torque that BLDC motor 550 is capable of generating (e.g., based on manufacturer specification). In some embodiments, failure torque 1506 is the motor torque that corresponds to the current threshold 562 which causes actuator 500 to cut power to BLDC motor 550, as described with reference to FIG. 8. Warning threshold 1508 can be a predetermined percentage of the failure torque 1506 (e.g., 75%, 85%, 90%, 95%, etc.). In some embodiments, failure predictor 1318 is configured to perform the failure prediction in response to the motor torque exceeding warning threshold 1508.

Failure predictor 1318 may determine the point 1514 at which regression line 1504 exceeds the failure torque 1506 (e.g., by calculating the point of intersection of regression line 1504 and the failure torque 1506). Failure predictor 1318 may identify the time value of intersection point 1514 as the predicted failure time 1512. Failure predictor 1318 may store the predicted failure time 1512 in memory and/or output the predicted failure time 1512 to a user device as previously described.

Communications Circuit

Figure 16:
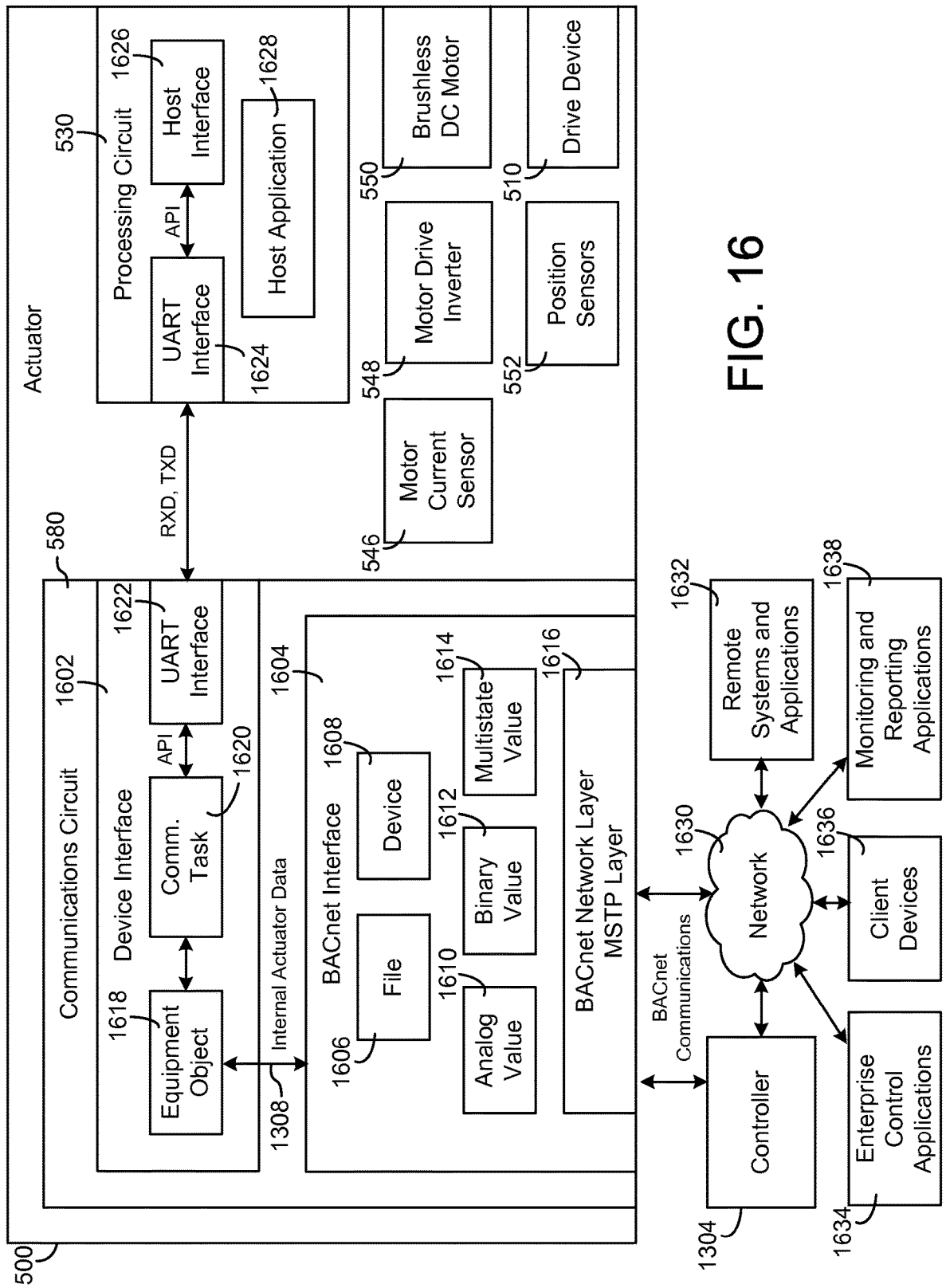
FIG. 16 is a block diagram illustrating a communications circuit which can be used to allow the actuator of FIGS. 5-7 to communicate using BACnet communications, according to some embodiments.

Referring now to FIG. 16, a block diagram illustrating communications circuit 580 in greater detail is shown, according to some embodiments. Communications circuit 580 can be configured to support a variety of data communications between actuator 500 and external systems or devices (e.g., controller 1304). Communications circuit 580 can be a wired or wireless communications link and may use any of a variety of disparate communications protocols (e.g., BACnet, LON, WiFi, Bluetooth, NFC, TCP/IP, etc.). In some embodiments, communications circuit 580 is an integrated circuit, chip, or microcontroller unit (MCU) separate from processing circuit 530 and configured to bridge communications between processing circuit 530 and external systems or devices.

In some embodiments, communications circuit 580 is the Johnson Controls BACnet on a Chip (JBOC) product. For example, communications circuit 580 can be a pre-certified BACnet communication module capable of communicating on a building automation and controls network (BACnet) using a master/slave token passing (MSTP) protocol. Communications circuit 580 can be added to any existing product to enable BACnet communication with minimal software and hardware design effort. In other words, communications circuit 580 provides a BACnet interface 1604 for actuator 500. An example of a communications circuit which can be used as communications circuit 580 is described in detail in U.S. patent application Ser. No. 15/207,431 filed Jul. 11, 2016, the entire disclosure of which is incorporated by reference herein.

Communications circuit 580 is shown to include a device interface 1602 and a BACnet interface 1604. Device interface 1602 can include an equipment object 1618, a communications task 1620 (e.g., a JBOC task), and universal asynchronous receiver/transmitter (UART) interface 1622. UART interface 1622 can be configured to communicate with a corresponding UART interface 1624 of processing circuit 530 using the UART protocol. In other embodiments, UART interfaces 1622-1624 can be replaced with serial peripheral interfaces (SPI) or inter-integrated circuit (I2C) interfaces.

Communications task 1620 can be connected to UART interface 1622 via an application-program interface (API) and can be configured to populate equipment object 1618 with values received from processing circuit 530 via UART interfaces 1622-1624. Communications task 1620 can also read values of equipment object 1618 set by BACnet interface 1604 and can provide the values to processing circuit 530. Similarly, UART interface 1624 can be connected to a host interface 1626 via an API and can be configured to communicate with a host application 1628. Host application 1628 may include, for example, any of the modules of processing circuit 530 described with reference to FIG. 8.

Equipment object 1618 can be a proprietary equipment object configured to expose internal actuator data 1308 to BACnet interface 1604. Attributes of equipment object 1618 can be defined by a user (e.g., using a data definition tool) to expose any type of internal actuator data 1308 to BACnet interface 1604. For example, attributes of equipment object 1618 can include the sensed motor current, end stop locations, actuator status, stroke length, actuator position, setpoint, and/or any other type of variable or parameter used or stored internally by actuator 500.

Host application 1628 can generate updated values for the attributes of equipment object 1618, which can be communicated to device interface 1608 via interfaces 1622-1624. The attributes of equipment object 1618 can be read by BACnet interface 1604 and communicated to controller 1304 as standard BACnet objects. For example, BACnet interface 1604 is shown to include several BACnet objects such as a file object 1606, a device object 1608, an analog value object 1610, a binary value object 1612, and a multistate value object 1614. Objects 1606-1614 can be mapped to corresponding attributes of equipment object 1618 to expose such attributes as standard BACnet objects. The mapping between equipment object 1618 and BACnet objects 1606-1614 is described in greater detail with reference to FIG. 17.

Still referring to FIG. 16, BACnet interface 1604 is shown to include a BACnet network layer and MSTP layer 1616. Layer 1616 can be configured to interface with BACnet objects 1606-1614 and an external communications network 1630 (e.g., a BACnet network). In some embodiments, layer 1616 communicates directly with controller 1304. Layer 1616 can be configured to facilitate BACnet communications using the MSTP Master protocol. For example, Layer 1616 can be configured to transmit and receive segmented messages and automatically determine a baud rate. Layer 1616 may support duplicate address avoidance by keeping a second device with a duplicate address from interfering with existing traffic. In other embodiments, layer 1616 may use other types of communications protocols such as TCP/IP, Ethernet, WiFi, Zigbee, NFC, etc.

Layer 1616 can be configured to read and write values to BACnet objects 1606-1614. For example, layer 1616 may receive a position setpoint from controller 1304 and update an instance of analog value object 1610 with the position setpoint. BACnet interface 1604 can be configured to write the values of BACnet objects 1606-1614 to attributes of equipment object 1618. The attribute values of equipment object 1618 can be communicated to processing circuit 530 via interfaces 1622-1624 and used by processing circuit 530 to operate actuator 500. Similarly, internal actuator data 1308 generated by processing circuit 530 can be written to equipment object 1618, mapped to BACnet objects 1606-1614, and read by layer 1616. Layer 1616 can send the values of BACnet objects 1606-1614 to controller 1304, network 1630, remote systems and applications 1632, enterprise control applications 1634, and/or monitoring and reporting applications 1638.

Figure 17:
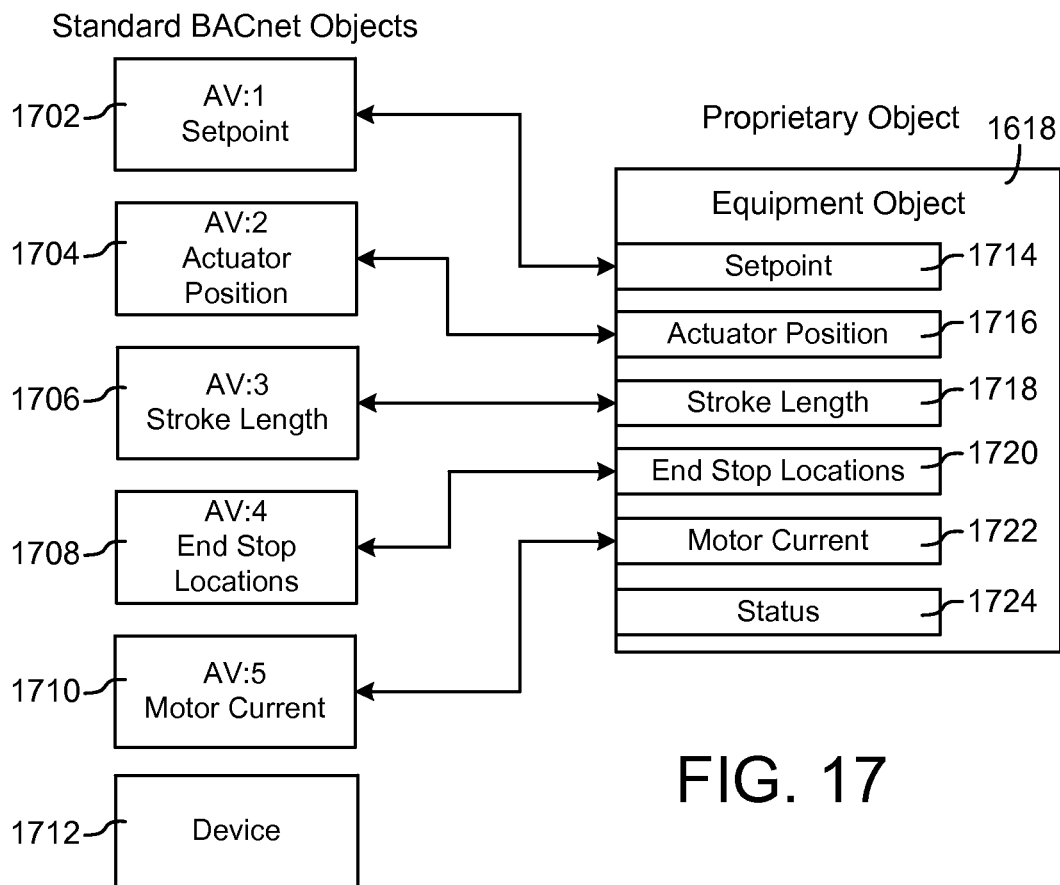
FIG. 17 is a block diagram illustrating a mapping between attributes of a proprietary equipment object and standard BACnet point objects which can be used by the communications circuit of FIG. 16 to enable BACnet communications, according to some embodiments.

Referring now to FIG. 17, a block diagram illustrating a mapping between attributes of equipment object 1618 and standard BACnet point objects 1702-1712 is shown, according to some embodiments. The attributes of equipment object 1618 can be defined by a user (e.g., using a data definition tool) and mapped to various types of internal actuator data 1308. For example, equipment object 1618 is shown to include a setpoint attribute 1714, an actuator position attribute 1716, a stroke length attribute 1718, an end stop locations attribute 1720, a motor current attribute 1722, and a status attribute 1724. Processing circuit 530 can be configured to interface with the attributes of equipment object 1618 in a more concise fashion than the standard BACnet point objects 1702-1712. For example, processing circuit 530 can read and write various items of internal actuator data 1308 to equipment object 1618 as values of attributes 1714-1724. Equipment object 1618 exposes the values of attributes 1714-1724 to BACnet interface 1604.

The standard BACnet objects are shown to include an analog value (AV) setpoint object 1702 mapped to setpoint attribute 1714, an AV actuator position object 1704 mapped to actuator position attribute 1716, an AV stroke length object 1706 mapped to stroke length attribute 1718, an AV end stop locations object 1708 mapped to end stop locations attribute 1720, an AV motor current object 1710 mapped to motor current attribute 1722, and a device object 1712. The status attribute 1724 is not shown mapped to a BACnet object. A user can choose to expose all or a subset of the attributes 1714-1724 as standard BACnet point objects by selectively mapping all or some of attributes 1714-1724 to BACnet objects 1702-1712. BACnet network layer and MSTP layer 1616 can read BACnet objects 1702-1712 and provide the values of BACnet objects 1702-1712 to controller 1304. Controller 1304 can monitor the value of AV motor current object 1710 to track the motor current over time, as previously described.

Equipment Failure Prediction Process

Figure 18:
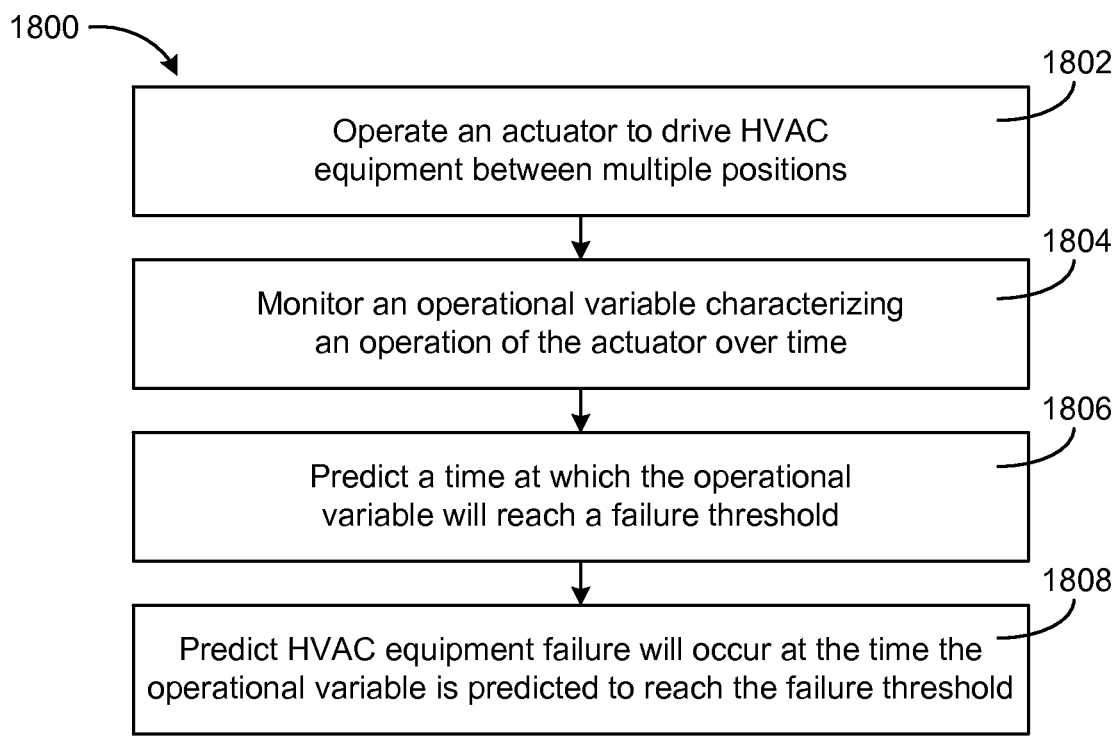
FIG. 18 is a flowchart of a process for predicting HVAC equipment failure, according to some embodiments.

Referring now to FIG. 18, a flowchart of a process 1800 for predicting HVAC equipment failure is shown, according to some embodiments. Process 1800 can be performed by one or more components of actuator 500 and/or controller 1304, as described with reference to FIGS. 13A-15.

Process 1800 is shown to include operating an actuator to drive HVAC equipment between multiple positions (step 1802). The actuator can be any type of actuator in a HVAC system. For example, the actuator can be a damper actuator, a valve actuator, a fan actuator, a pump actuator, or any other type of actuator that can be used in a HVAC system or BMS. In various embodiments, the actuator can be a linear actuator (e.g., a linear proportional actuator), a non-linear actuator, a spring return actuator, or a non-spring return actuator. In some embodiments, the actuator is the same or similar to actuator 500, as described with reference to FIGS. 5-12. For example, the actuator may include a drive device driven by a BLDC motor and a motor drive inverter. The motor drive inverter may receive a PWM output signal and/or phase switch outputs from a processing circuit and may provide a three-phase PWM voltage output to the BLDC motor. The BLDC motor may drive the drive device, which can be connected to the HVAC equipment.

The HVAC equipment can be any type of equipment in a HVAC system. For example, the HVAC equipment can include a damper, a valve, a robotic arm, or any other type of system or device that can be operated by an actuator. In some embodiments, the HVAC equipment is the same or similar to equipment 1302, as described with reference to FIGS. 13A-15. The drive device may apply a torque or force to the HVAC equipment which causes the HVAC equipment to move between an open position and a closed position. In some embodiments, the torque or force applied to the HVAC equipment is proportional to the electric current provided to the BLDC motor.

Still referring to FIG. 18, process 1800 is shown to include monitoring an operational variable characterizing an operation of the actuator over time (step 1804). In some embodiments, the operational variable is a part of internal actuator data used or stored by the actuator (e.g., internal actuator data 1308). The operational variable may include any type of signal, variable, or parameter used by the actuator. For example, the operational variable may include the sensed motor current (e.g., motor current 560), a measured or calculated motor torque, the actuator position or speed, configuration parameters, end stop locations, stroke length parameters, time series data, a cumulative number of stop/start commands, a total distance traveled, an amount of time required to open/close the HVAC equipment, or any other type of data used or stored internally within the actuator.

In some embodiments, step 1804 includes transmitting the internal actuator data (including the value of the operational variable) from the actuator to an external controller (e.g., controller 1304). The internal actuator data can be transmitted via a communications circuit of the actuator (e.g., communications circuit 580). Conventional actuators typically only output a feedback signal indicating the actuator position, but do not output or report any other types of data. However, the communications circuit may enable the actuator to output a variety of different types of internal actuator data. The controller can perform step 1804 by monitoring the value of the operational variable over time (as described with reference to FIG. 13A). Alternatively, step 1804 can be performed by the actuator (as described with reference to FIG. 13B).

Still referring to FIG. 18, process 1800 is shown to include predicting a time at which the operational variable will reach a failure threshold (step 1806). Step 1806 can be performed by failure predictor 1318 when implemented as a component of the actuator or as a component of the controller. Step 1806 can include monitoring the motor current and/or the motor torque over time to determine a rate at which the nominal motor current and/or the nominal motor torque is increasing. The nominal motor current can be defined as the average motor current while the HVAC equipment is moving between positions. Similarly, the nominal motor torque can be defined as the average torque applied by the motor equipment while the HVAC equipment is moving between positions. Step 1806 can include calculating the motor torque based on measurements of the motor current or can receive the motor torque as an output from the actuator.

In some embodiments, step 1806 includes using a regression technique to fit a line or curve to a set of data points indicating the nominal motor current and/or the nominal motor torque over time. Such data points can be collected (e.g., measured, calculated, etc.) over a time period that spans days, weeks, months, or years. Step 1806 can include projecting or extrapolating the nominal motor current and/or the nominal motor torque forward in time to predict the motor current and/or the motor torque into the future. Step 1806 can include determining a time at which the predicted motor current and/or the predicted motor torque exceeds a threshold value (e.g., a torque threshold, a current threshold, etc.).

In other embodiments, step 1806 can be performed using other types of internal actuator data received from the actuator. For example, step 1806 can include receiving a total number of open/close commands, a total distance traveled, and/or an amount of time required for the HVAC equipment to move between an open position and a closed position. Step 1806 can include monitoring the total number of open/close commands over time to determine a rate at which the total number of open/close commands is increasing. Step 1806 can include predicting a time at which the total number of open/close commands will exceed a threshold value based on the determined rate of change. Similarly, step 1806 can include monitoring the total distance traveled, the amount of time required to move between open and closed positions over time, and/or a rate at which such variables are increasing. Step 1806 can include predicting a time at which the total distance traveled and/or the amount of time required to move between open and closed positions will exceed a threshold value based on the determined rate of change.

Still referring to FIG. 18, process 1800 is shown to include predicting HVAC equipment failure will occur at the time the operational variable is predicted to reach the failure threshold (step 1808). In some embodiments, step 1808 includes identifying the time at which the predicted motor current and/or the predicted motor torque exceeds the threshold value as the predicted failure time. In some embodiments, steps 1806-1808 are performed in response to the measured motor current and/or motor torque exceeding a warning threshold (e.g., 75% of the failure threshold, 85% of the failure threshold, etc.).

In some embodiments, process 1800 includes generating a warning message that includes the predicted failure time and providing the warning message as an output to a user device. The warning message may indicate that the motor current and/or motor torque has exceeded the warning threshold and that equipment failure is predicted to occur at the predicted failure time. In some embodiments, the warning message prompts the user to repair or replace the HVAC equipment before failure occurs (i.e., before the predicted failure time). For example, the warning message may include contact information for a repair service (e.g., a telephone number or website URL), information for ordering replacement parts, and/or other types of information that can assist the user in preemptively repairing or replacing the HVAC equipment before failure occurs.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for predicting HVAC equipment failure, the system comprising:
an actuator coupled to HVAC equipment and configured to drive the HVAC equipment between multiple positions, the actuator comprising:
a processing circuit configured to collect internal actuator data characterizing an operation of the actuator, the internal actuator data comprising a measured or calculated value of an operational variable; and
a communications circuit coupled to the processing circuit and configured to transmit the internal actuator data outside the actuator; and
a controller configured to provide control signals to the actuator and receive the internal actuator data from the actuator, the controller comprising a failure predictor configured to:
monitor the value of the operational variable over time;
predict a time at which the value of the operational variable will reach a failure threshold; and
identify the predicted time at which the value of the operational variable will reach the failure threshold as a predicted time at which the HVAC equipment failure will occur.

2. The system of claim 1, wherein the actuator comprises a motor and a drive device driven by the motor, the drive device coupled to the HVAC equipment and configured to drive the HVAC equipment between the multiple positions;
wherein the internal actuator data characterizes an operation of the motor.

3. The system of claim 2, wherein the measured or calculated value of the operational variable comprises at least one of:
an electric current provided to the motor; or
a torque applied by the motor.

4. The system of claim 3, wherein the processing circuit is configured to increase at least one of the electric current provided to the motor or the torque applied by the motor to compensate for increased resistance to movement of the HVAC equipment resulting from degradation of the HVAC equipment over time;
wherein the predicted time at which the HVAC equipment failure will occur is a time at which the electric current provided to the motor or the torque applied by the motor is predicted to reach the failure threshold.

5. The system of claim 1, wherein the failure predictor is configured to:
  identify a plurality of values of the operational variable, each value of the operational variable characterizing the operation of the actuator at a different time since the actuator was installed;
  generate a plurality of data points representing the plurality of values of the operational variable over time, each of the plurality of data points comprising a time value and a corresponding value of the operational variable;
  perform a regression to fit a line to the plurality of data points and identify a slope of the line as a rate-of-change of the operational variable; and
  predict the time at which the value of the operational variable will reach the failure threshold based on the rate-of-change of the operational variable.

6. The system of claim 1, wherein the measured or calculated value of the operational variable comprises at least one of:
  a speed at which the actuator moves the HVAC equipment;
  a cumulative number of stop/start commands provided to the actuator by the controller;
  a total distance traveled by the HVAC equipment; or
  an amount of time required to move the HVAC equipment between the multiple positions.

7. An actuator in a HVAC system, the actuator comprising:
  a motor;
  a drive device driven by the motor and coupled to HVAC equipment, the drive device configured to drive the HVAC equipment between multiple positions;
  a processing circuit configured to collect internal actuator data characterizing an operation of the actuator, the internal actuator data comprising a measured or calculated value of an operational variable, the processing circuit comprising a failure predictor configured to:
    monitor the value of the operational variable over time;
    predict a time at which the value of the operational variable will reach a failure threshold; and
    identify the predicted time at which the value of the operational variable will reach the failure threshold as a predicted time at which a failure of the HVAC equipment will occur; and
  a communications circuit coupled to the processing circuit and configured to transmit the predicted time at which the failure of the HVAC equipment will occur outside the actuator.

8. The actuator of claim 7, wherein the measured or calculated value of the operational variable characterizes an operation of the motor, the operational variable comprising at least one of:
  an electric current provided to the motor; or
  a torque applied by the motor.

9. The actuator of claim 7, wherein the processing circuit is configured to increase at least one of an electric current provided to the motor or a torque applied by the motor to compensate for increased resistance to movement of the HVAC equipment resulting from degradation of the HVAC equipment over time;
  wherein the predicted time at which the failure of the HVAC equipment will occur is a time at which the electric current provided to the motor or the torque applied by the motor is predicted to reach the failure threshold.

10. The actuator of claim 7, wherein the failure predictor is configured to:
  identify a plurality of values of the operational variable, each value of the operational variable characterizing the operation of the actuator at a different time since the actuator was installed;
  generate a plurality of data points representing the plurality of values of the operational variable over time, each of the plurality of data points comprising a time value and a corresponding value of the operational variable;
  perform a regression to fit a line to the plurality of data points and identify a slope of the line as a rate-of-change of the operational variable; and
  predict the time at which the value of the operational variable will reach the failure threshold based on the rate-of-change of the operational variable.

11. The actuator of claim 7, wherein the measured or calculated value of the operational variable comprises at least one of:
  a speed at which the actuator moves the HVAC equipment;
  a cumulative number of stop/start commands provided to the actuator;
  a total distance traveled by the HVAC equipment; or
  an amount of time required to move the HVAC equipment between the multiple positions.

12. A method for predicting HVAC equipment failure, the method comprising:
  operating an actuator coupled to HVAC equipment to drive the HVAC equipment between multiple positions;
  collecting internal actuator data characterizing an operation of the actuator, the internal actuator data comprising a measured or calculated value of an operational variable;
  identifying a plurality of values of the operational variable, each value of the operational variable characterizing the operation of the actuator at a different time since the actuator was installed;
  generating a plurality of data points representing the plurality of values of the operational variable over time, each of the plurality of data points comprising a time value and a corresponding value of the operational variable;
  performing a regression to fit a line to the plurality of data points and identifying a slope of the line as a rate-of-change of the operational variable; and
  predicting a time at which the value of the operational variable will reach a failure threshold based on the rate-of-change of the operational variable; and
  identifying the predicted time at which the value of the operational variable will reach the failure threshold as a predicted time at which the HVAC equipment failure will occur.

13. The method of claim 12, further comprising:
  providing control signals to the actuator from a controller; and
  transmitting the internal actuator data from the actuator to the controller;
  wherein the predicting and identifying steps are performed by a failure predictor within the controller.

14. The method of claim 12, wherein the predicting and identifying steps are performed by a failure predictor within the actuator;

the method further comprising transmitting the predicted time at which the HVAC equipment failure will occur outside the actuator.

15. The method of claim 12, wherein the actuator comprises a motor and a drive device driven by the motor, the drive device coupled to the HVAC equipment and configured to drive the HVAC equipment between the multiple positions;
wherein the internal actuator data characterizes an operation of the motor.

16. The method of claim 15, wherein the operational variable comprises at least one of:
an electric current provided to the motor; or
a torque applied by the motor.

17. The method of claim 16, further comprising:
increasing at least one of the electric current provided to the motor or the torque applied by the motor to compensate for increased resistance to movement of the HVAC equipment resulting from degradation of the HVAC equipment over time;
wherein the predicted time at which the HVAC equipment failure will occur is a time at which the electric current provided to the motor or the torque applied by the motor is predicted to reach the failure threshold.

18. A system for predicting HVAC equipment failure, the system comprising:
an actuator coupled to HVAC equipment and configured to drive the HVAC equipment between multiple positions, the actuator comprising:
a motor and a drive device driven by the motor, the drive device coupled to the HVAC equipment and configured to drive the HVAC equipment between the multiple positions;
a processing circuit configured to:
collect internal actuator data characterizing an operation of the actuator, the internal actuator data comprising a measured or calculated value of an operational variable comprising at least one of:
an electric current provided to the motor; or
a torque applied by the motor; and
increase at least one of the electric current provided to the motor or the torque applied by the motor to compensate for increased resistance to movement of the HVAC equipment resulting from degradation of the HVAC equipment over time; and
a communications circuit coupled to the processing circuit and configured to transmit the internal actuator data outside the actuator; and
a controller configured to provide control signals to the actuator and receive the internal actuator data from the actuator, the controller comprising a failure predictor configured to use the internal actuator data to predict a time at which the HVAC equipment failure will occur, wherein the predicted time at which the HVAC equipment failure will occur is a time at which the electric current provided to the motor or the torque applied by the motor is predicted to reach a failure threshold.

19. An actuator in a HVAC system, the actuator comprising:
a motor;
a drive device driven by the motor and coupled to HVAC equipment, the drive device configured to drive the HVAC equipment between multiple positions;
a processing circuit configured to:
collect internal actuator data characterizing an operation of the actuator;
increase at least one of an electric current provided to the motor or a torque applied by the motor to compensate for increased resistance to movement of the HVAC equipment resulting from degradation of the HVAC equipment over time; and
use the internal actuator data to predict a time at which a failure of the HVAC equipment will occur; and
a communications circuit coupled to the processing circuit and configured to transmit the predicted time at which the failure of the HVAC equipment will occur outside the actuator, wherein the predicted time at which the failure of the HVAC equipment will occur is a time at which the electric current provided to the motor or the torque applied by the motor is predicted to reach a failure threshold.

20. A method for predicting HVAC equipment failure, the method comprising:
operating an actuator comprising a motor and a drive device driven by the motor, the drive device coupled to HVAC equipment and configured to drive the HVAC equipment between multiple positions;
collecting internal actuator data characterizing an operation of the actuator, the internal actuator data comprising a measured or calculated value of an operational variable, the operational variable comprising at least one of:
an electric current provided to the motor; or
a torque applied by the motor;
increasing at least one of the electric current provided to the motor or the torque applied by the motor to compensate for increased resistance to movement of the HVAC equipment resulting from degradation of the HVAC equipment over time;
predicting a time at which the value of the operational variable will reach a failure threshold; and
identifying the predicted time at which the value of the operational variable will reach the failure threshold as a predicted time at which the HVAC equipment failure will occur, wherein the predicted time at which the HVAC equipment failure will occur is a time at which the electric current provided to the motor or the torque applied by the motor is predicted to reach the failure threshold.

* * * * *